United States Patent
Machida

(10) Patent No.: US 8,677,353 B2
(45) Date of Patent: Mar. 18, 2014

(54) PROVISIONING A STANDBY VIRTUAL MACHINE BASED ON THE PREDICTION OF A PROVISIONING REQUEST BEING GENERATED

(75) Inventor: Fumio Machida, Tokyo (JP)

(73) Assignee: NEC Corporation, Tokyo (JP)

(*) Notice: Subject to any disclaimer, the term of this patent is extended or adjusted under 35 U.S.C. 154(b) by 883 days.

(21) Appl. No.: 12/522,825

(22) PCT Filed: Jan. 10, 2008

(86) PCT No.: PCT/JP2008/050173
§ 371 (c)(1),
(2), (4) Date: Jul. 10, 2009

(87) PCT Pub. No.: WO2008/084826
PCT Pub. Date: Jul. 17, 2008

(65) Prior Publication Data
US 2010/0058342 A1    Mar. 4, 2010

(30) Foreign Application Priority Data
Jan. 11, 2007   (JP) ................................. 2007-003823

(51) Int. Cl.
G06F 9/455    (2006.01)
G06F 9/46     (2006.01)
G06F 11/00    (2006.01)

(52) U.S. Cl.
USPC ............... 718/1; 718/104; 718/105; 714/4.11

(58) Field of Classification Search
None
See application file for complete search history.

(56) References Cited

U.S. PATENT DOCUMENTS

| | | | |
|---|---|---|---|
| 6,986,139 B1 * | 1/2006 | Kubo | 718/105 |
| 7,117,499 B2 * | 10/2006 | Kawamoto et al. | 718/105 |
| 2004/0003319 A1 * | 1/2004 | Ukai et al. | 714/25 |

(Continued)

FOREIGN PATENT DOCUMENTS

| | | |
|---|---|---|
| JP | 1994110715 A | 4/1994 |
| JP | 2005011331 A | 1/2005 |

(Continued)

OTHER PUBLICATIONS

A. Takayasu, "Web Archiecture Sekkeijutsu Dai 4 Kai Un'yosei o Takameru-Jissenhen-Server Togo de Machine o Sakujo Yojo Machine wa Resource Pool ni", Nikkei Systems, No. 165, Nikkei Business Publications, Inc. pp. 130-134, Dec. 26, 2006.

(Continued)

Primary Examiner — Meng An
Assistant Examiner — Tammy Lee
(74) Attorney, Agent, or Firm — Sughrue Mion, PLLC

(57) ABSTRACT

A shared server 40 includes an active virtual machine 41 where a sufficient amount of resources are allocated to an operation of an application system and a standby virtual machine 42 that starts with a minimum amount of resources. When it is predicted that a provisioning request is generated, a standby construction determining unit 22 previously executes provisioning on a standby virtual machine 42, and performs a start of an OS and an application or a setting change of a network apparatus. A provisioning determining unit 23 changes the resource allocation amounts of the active virtual machine 41 and the standby virtual machine 42, allocates a sufficient amount of resources to the standby virtual machine 42, registers the standby virtual machine 42 as a target of load balancing in a load balancer 11, and executes provisioning.

33 Claims, 13 Drawing Sheets

(56) References Cited

U.S. PATENT DOCUMENTS

| | | | |
|---|---|---|---|
| 2004/0143664 A1* | 7/2004 | Usa et al. | 709/226 |
| 2004/0187106 A1* | 9/2004 | Tanaka et al. | 718/1 |
| 2005/0081210 A1* | 4/2005 | Day et al. | 718/104 |
| 2005/0114739 A1* | 5/2005 | Gupta et al. | 714/39 |
| 2006/0117317 A1* | 6/2006 | Crawford et al. | 718/104 |
| 2006/0155912 A1* | 7/2006 | Singh et al. | 711/6 |
| 2006/0184287 A1* | 8/2006 | Belady et al. | 700/291 |
| 2006/0184939 A1* | 8/2006 | Sahoo et al. | 718/100 |
| 2006/0242647 A1* | 10/2006 | Kimbrel et al. | 718/104 |
| 2007/0043860 A1* | 2/2007 | Pabari | 709/224 |
| 2007/0094659 A1* | 4/2007 | Singh et al. | 718/1 |
| 2008/0104608 A1* | 5/2008 | Hyser et al. | 718/105 |
| 2009/0282404 A1* | 11/2009 | Khandekar et al. | 718/1 |
| 2012/0030685 A1* | 2/2012 | Jackson | 718/104 |

FOREIGN PATENT DOCUMENTS

| | | |
|---|---|---|
| JP | 2005141605 A | 6/2005 |
| JP | 2006221382 A | 8/2006 |
| JP | 2007200128 A | 8/2007 |

OTHER PUBLICATIONS

International Search Report for PCT/JP2008/050173 mailed Apr. 15, 2008.

P. Barham et al., "Xen and the Art of Virtualization", 19th ACM Symposium on Operating Systems Principles (SOSP19), 2003.

* cited by examiner

F I G. 5
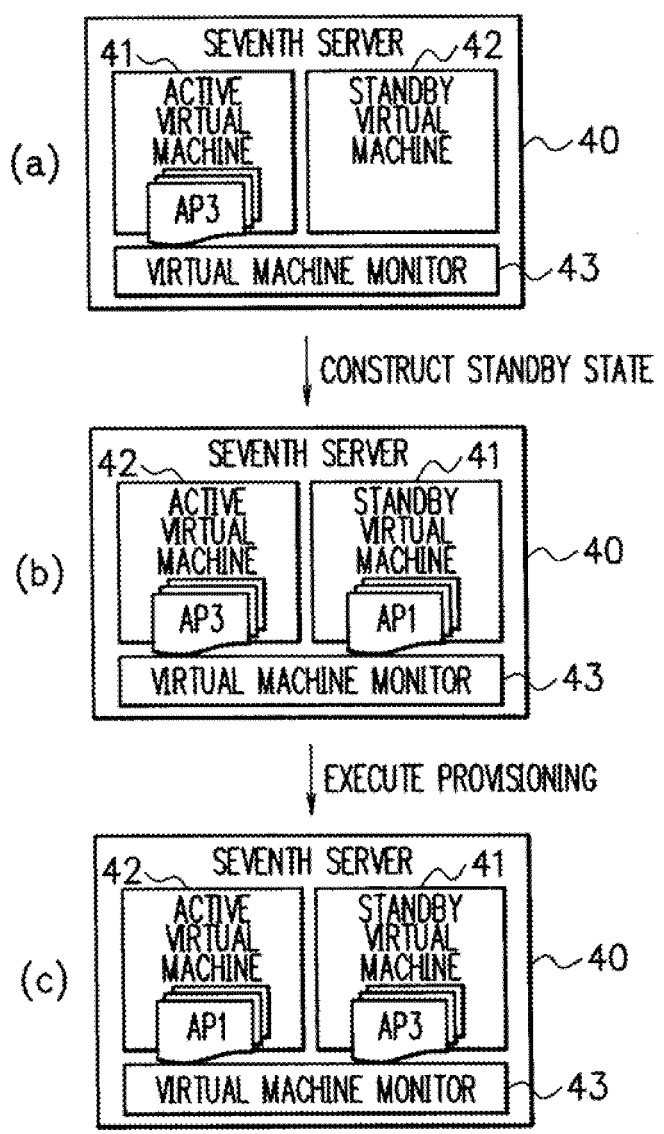

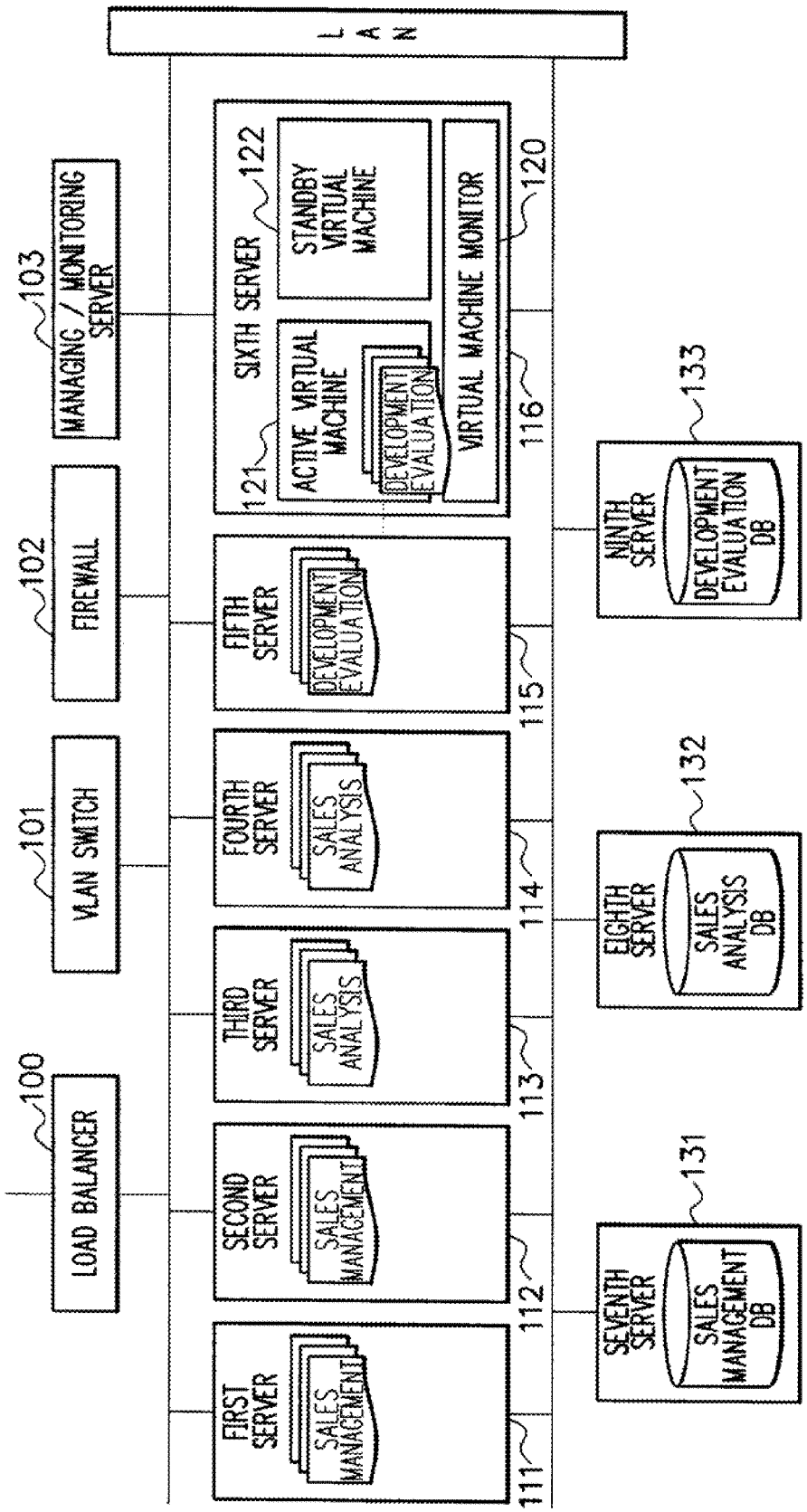

F I G. 7

PERFORMANCE FEATURE VECTOR $v = (x_1, x_2, .. x_6)$ (a)

| $x_1$ | SALES MANAGEMENT : AVERAGE VALUE OF CPU UTILIZATION COEFFICIENT |
| --- | --- |
| $x_2$ | SALES MANAGEMENT : AVERAGE VALUE OF DISK I/O |
| $x_3$ | SALES ANALYSIS : AVERAGE VALUE OF CPU UTILIZATION COEFFICIENT |
| $x_4$ | SALES ANALYSIS : AVERAGE VALUE OF DISK I/O |
| $x_5$ | DEVELOPMENT EVALUATION : AVERAGE VALUE OF CPU UTILIZATION COEFFICIENT |
| $x_6$ | DEVELOPMENT EVALUATION : AVERAGE VALUE OF DISK I/O |

PATTERN DATA $v = (x_0, x_1, .. x_n)$ → "REQUEST STATE"

(b)

| (70.6,152.8,5.4,8,9.4,173.6) → "SALES MANAGEMENT" |
| --- |
| (10.6,70.8,9.4,168.7,6.2,7.2) → "NO REQUEST" |
| (83.2,146.2,10.4,181.6,4.8,8.8) → "SALES MANAGEMENT" |
| (10.8,83.8,20.8,96.8,6.4,6.4) → "SALES ANALYSIS" |
| ... |

STATE CHANGE COST GRAPH

FIG. 9

REQUEST PROBABILITY PREDICTION VALUE BY LOGISTIC REGRESSION ANALYSIS (a) $\begin{cases} \text{SALES MANAGEMENT : 0.92} \\ \text{SALES ANALYSIS : 0.21} \\ \text{DEVELOPMENT EVALUATION : 0.01} \\ \text{NO REQUEST : 0.34} \end{cases}$

PROVISIONING REQUEST PROBABILITY (RATIO)

(b) $\begin{cases} \text{SALES MANAGEMENT : } 0.92 / 1.48 = 0.62 \\ \text{SALES ANALYSIS : } 0.21 / 1.48 = 0.14 \\ \text{DEVELOPMENT EVALUATION : } 0.01 / 1.48 = 0.006 \\ \text{NO REQUEST : } 0.34 / 1.48 = 0.23 \end{cases}$

FIG. 10

EXPECTATION PROVISIONING TIME $\begin{cases} E_{\text{SALES MANAGEMENT}} = 0.62^*0 + 0.14^*49 + 0.01^*50 = \boxed{7.36} \\ E_{\text{SALES ANALYSIS}} = 0.62^*60 + 0.14^*0 + 0.01^*50 = 37.7 \\ E_{\text{DEVELOPMENT EVALUATION}} = 0.62^*57 + 0.14^*45 + 0.01^*0 = 41.46 \\ E_{\text{NONE}} = 0.62^*39 + 0.14^*30 \ ^* 0.01^*30 = 25.44 \end{cases}$

MINIMUM VALUE

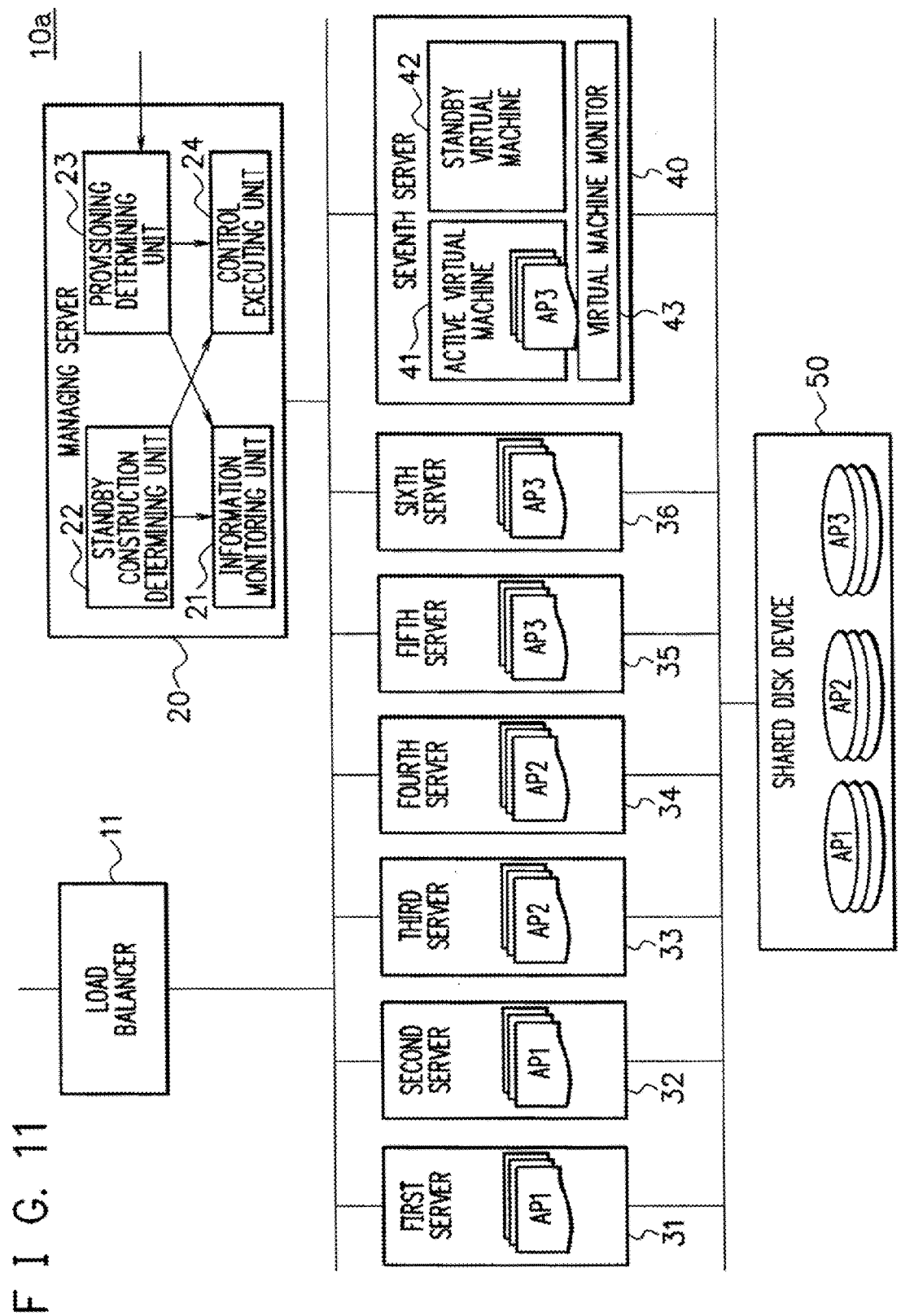

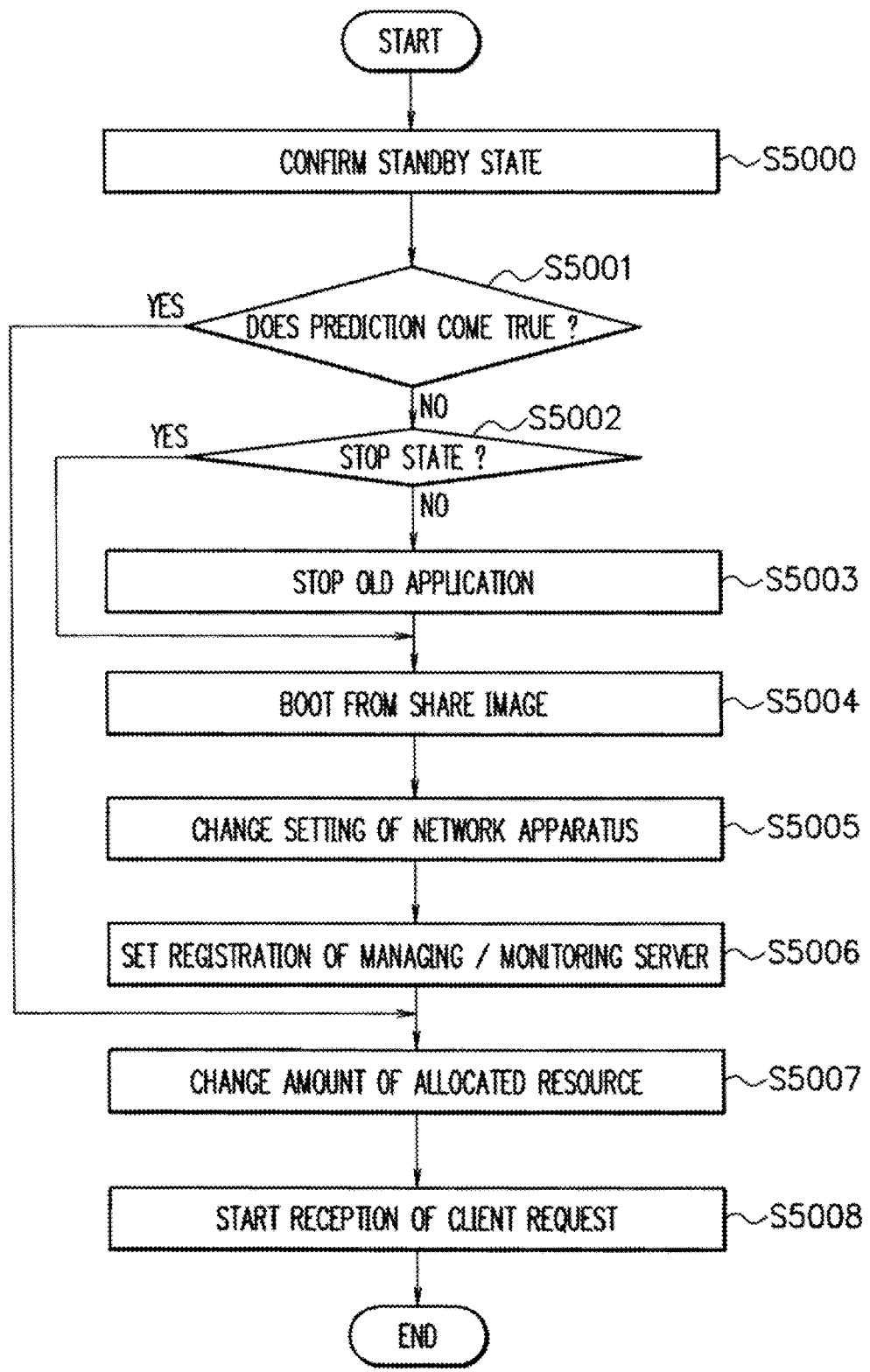

F I G. 13
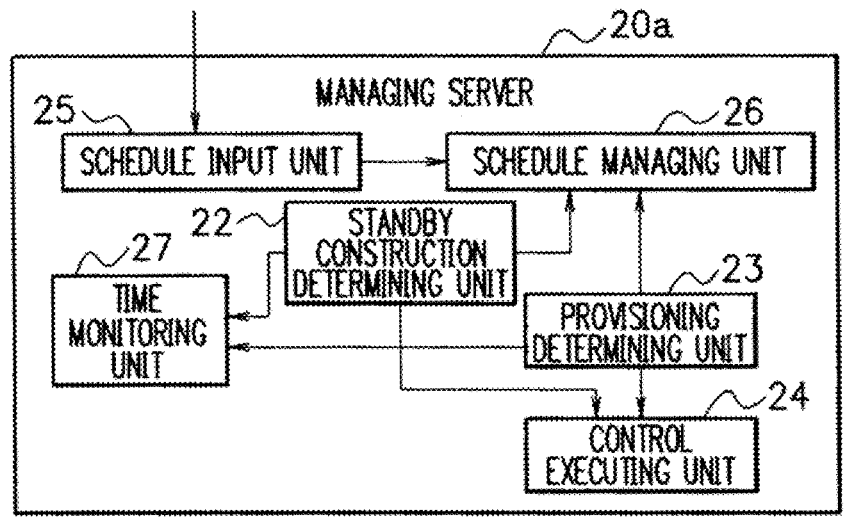
F I G. 14
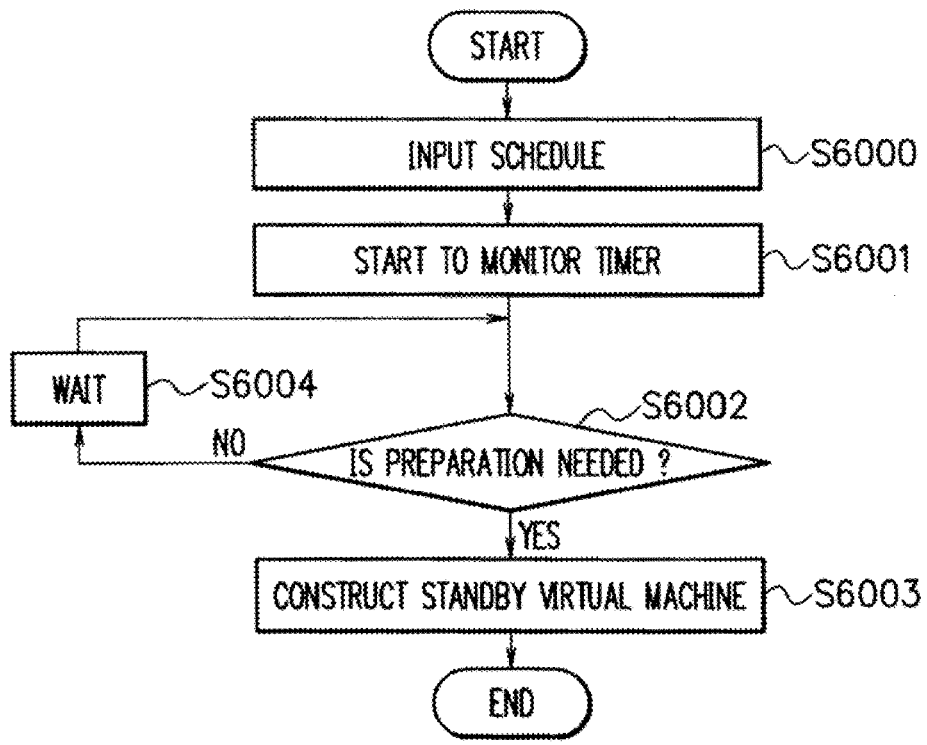

| DATE AND TIME | OBJECT SERVER | PROVISIONING REQUEST |
|---|---|---|
| 12/26 10:00 | SEVENTH SERVER | "AP1" |
| ... | ... | ... | ns
PROVISIONING A STANDBY VIRTUAL MACHINE BASED ON THE PREDICTION OF A PROVISIONING REQUEST BEING GENERATED

TECHNICAL FIELD

The present invention relates to a provisioning system, method, and program, and, more particularly, to a provisioning system, method, a program that switch an application system operating on a server.

BACKGROUND ART

In data centers or information system in enterprises that operate a plurality of application systems using limited computers, resources have been effectively used using provisioning of a server. The provisioning of the server is a process that changes the configuration of a pool server shared by a plurality of application systems to the configuration of a specific application server. The configuration changing process includes a switching process of an OS, an application setup process, and a setting changing process of a network apparatus or a storage device.

A provisioning function is sold and provided as a software product. However, when the provisioning function is actually used, a process time that is related to provisioning becomes a problem. For example, the provisioning function is used in a large-scale complicated system, a time of several minutes or more is needed to execute the switching process of the OS or the configuration changing process of the network. For this reason, when a scale of a system becomes increased and complicated, it becomes difficult to quickly perform the provisioning of the server when an accidental load change or failure occurs.

In Patent Document 1, an example of a provisioning system for a typical load balancing is disclosed. The system disclosed in Patent Document 1 is a system that subjects a request from a client computer to a Web server and performs a load balancing using a load balancer (LB). The system increases and decreases the number of Web servers to be a target of load balancing in accordance with a load situation, and optimizes the number of operating servers. In this system, since a simple system that is composed of a Web server is basically used, the provisioning is completed by only a boot process of an OS application.

Meanwhile, a number of Web application systems include a plurality of server systems, such as an application server (AP server) or a database server (DB server) and a managing server that manages the application server or a network. Accordingly, when the AP sever is subjected to the provisioning, it is needed to execute not only the boot process of the OS and the application but also a connection setting process to a DB server or a registering process to a managing server, an update application process of the application, and the configuration changing process of the network. For this reason, when the method disclosed in Patent Document 1 is applied to the Web application system, an overhead related to processes other than the boot process of the OS and the application cannot be ignored.

Further, in the method disclosed in Patent Document 1, the configuration where the OS and the application image are stored in a storage area network (SAN) and shared is basically used. Such a system configuration cannot be generally used at a current point of time. When the system configuration is applied to the existing system, the system needs to be reconstructed. For example, a method in which a blade system where the SAN is integrated is newly introduced is considered, but this method is not suitable for an object of effectively using the system during the operation.

In Patent Document 2, as a method for reducing a time related to setting of a computer, a method where an OS or an application is operated on a shared computer to generate a standby state is disclosed. In the method disclosed in Patent Document 2, a standby (hot standby) is not maintained as a specific application system, but a standby is maintained in a middle state that can be set in another application system. In this way, it is possible to reduce a computer setting time to a plurality of application systems on the average.

Patent Document 2 discloses a method to speed up provisioning of a pool server that is not used as a specific application system. However, it is not possible to speed up provisioning for switching the pool server, which is being used as a portion of the application system, into another application system.

Meanwhile, in order to integrate distributed servers into one server and decrease a cost or management work, it has been recently reported a case in which a virtualization technology of a server is introduced. Among various virtualization technologies, in a virtualization method that uses a virtual machine monitor shown in Non-Patent Document 1, a deterioration of performance an OS environment that operates in a virtualization environment is reduced, and sufficient performance can be realized even though a plurality of OSs are operated on a existing server. A virtual machine that is generated by the virtual machine monitor can dynamically change computer resources of a CPU or a memory during the OS operation, and has availability higher than that of partitioning of hardware. In order to use a resource efficiently, it is considered to apply a function of a virtual machine monitor that changes a resource allocation dynamically.

Patent Document 1: Japanese Patent Application Laid-Open No. 2005-11331

Patent Document 2: Japanese Patent Application No. 2006-19409

Non-Patent Document 1: B. Dragovic, K. Fraser, S. Hand, T. Harris, A. Ho, I. Pratt, A. Warfield, P. Barham and R. Neugebauer, Xen and the Art of Virtualization, $19^{th}$ ACM Symposium on Operating Systems Principles (SOSP19), 2003

DISCLOSURE OF THE INVENTION

Problems to be Solved by the Invention

In the provisioning system according to the related art, the following problems exist. According to a first problem, in a system that depends on the configuration of a network or the configuration of a plurality of servers, it is difficult to quickly perform provisioning of a server to correspond to a sudden load change or a failure occurrence. This reason is because the provisioning process includes a network configuration changing process or a registering process to a managing server, and an application update application process, and a large amount of time is needed to execute these processes.

According to a second problem, it is not possible to effectively use the existing system and quickly perform provisioning on a server to correspond to an accidental load change or a failure occurrence. This reason is as follows. In a system that does not includes the SAN as a constituent element, the configuration where a disk image of an OS is shared and a boot is performed at a high speed is not used, and a large amount of time is needed to switch the OS or set up an application system.

According to a third problem, when an application system during the operation is subjected to provisioning as another application system, high-speed switching cannot be performed. This reason is as follows. After stopping the application during the operation, provisioning needs to newly start, and a method of increasing a speed of provisioning using a standby state cannot be applied.

The prevent invention has been made up to solve the above-described problems, and it is an object of the present invention to provide a provisioning system, method, and program that can quickly perform provisioning of a server to correspond to an accidental load change or a failure occurrence, in a system that depends on the configuration of a network or the configuration of a plurality of servers.

It is another object of the present invention to provide a provisioning system, method, and program that can quickly perform provisioning of a server by effectively using an existing system.

It is still another object of the present invention to provide a provisioning system, method, and program that can quickly switch an application system during the operation into another application system.

Means for Solving the Problems

In order to achieve the above-described objects, a provisioning system of the present invention is a provisioning system that performs provisioning of a server in a system that operates two or more application systems by a plurality of servers. At least one of the plurality of servers is configured as a shared server that configures a plurality of virtual machines. The provisioning system includes: a standby constructing unit that starts a standby virtual machine with the resource amount smaller than the resource amount allocated to an active virtual machine on a shared server where the active virtual machine for operating an application system is constructed, and previously executes provisioning on the standby virtual machine; and a provisioning executing unit that changes the resource allocation amounts of the active virtual machine and the standby virtual machine and performs the provisioning.

A provisioning method of the present invention is a provisioning method that uses a computer and performs provisioning of a server in a system that operates two or more application systems by a plurality of servers. At least one of the plurality of servers is configured as a shared server that configures a plurality of virtual machines. The provisioning method includes: a standby constructing step of allowing the computer to start a standby virtual machine with the resource amount smaller than the resource amount of an active virtual machine on the same shared server as the active virtual machine for operating an application system, and previously execute provisioning on the standby virtual machine; and a provisioning executing step of allowing the computer to change the resource allocation amounts of the active virtual machine and the standby virtual machine and perform the provisioning.

A program of the present invention is a program that allows a computer to execute a process of performing provisioning of a server in a system that operates two or more application systems by a plurality of servers that include at least one shared server configuring a plurality of virtual machines. The program allows the computer to execute: a standby constructing process of allowing the computer to start a standby virtual machine with the resource amount smaller than the resource amount of an active virtual machine on the same shared server as the active virtual machine for operating an application system, and previously execute provisioning on the standby virtual machine; and a provisioning executing process of allowing the computer to change the resource allocation amounts of the active virtual machine and the standby virtual machine and perform the provisioning.

In the provisioning system, method, and program of the present invention, before provisioning is actually performed, provisioning is previously performed on the standby virtual machine that starts on the shared server. When provisioning is requested, provisioning is performed by changing the resource amount that is allocated to the active virtual machine and the resource amount that is allocated to the standby virtual machine for allocating the sufficient resource amount to the standby virtual machine, and using the standby virtual machine to operate the application system. Before provisioning is actually performed, a preparation for provisioning is previously performed on the standby virtual machine that starts on the shared server, and a starting process of an OS and an application, a network configuration changing process, or a registration setting process to other servers are previously executed on the standby virtual machine. As a result, it is possible to perform provisioning of the server at a high speed, and to quickly perform provisioning of the server to correspond to an accidental load change or a failure occurrence. Further, since provisioning can be performed at a high speed by constructing the standby virtual server in the shared server, the system does not require a SAN configuration, and it is possible to quickly perform provisioning of the server by effectively using the existing system. Further, at a point of time when provisioning is previously performed, the minimum resource amount is allocated to the standby virtual machine, and the sufficient resource amount is allocated to the active virtual machine. At the time of provisioning, the sufficient resource amount is allocated to the standby virtual machine and the minimum resource amount is allocated to the active virtual machine, thereby switching the application system at a high speed.

In the provisioning system of the present invention, the standby constructing unit acquires a load state of the server, predicts whether a provisioning request is generated based on the acquired load state, and starts the standby virtual machine when it is predicted that the provisioning request is generated. The standby constructing unit predicts generation of a future provisioning request, starts the standby virtual machine on the shared server in preparation for the provisioning, and previously performs provisioning on the standby virtual machine. In this case, when a provisioning request is actually generated and an application system of a target of provisioning is matched with an application system where provisioning is previously performed on the standby virtual machine, provisioning is completed using the standby virtual machine on which provisioning is previously performed. As a result, as compared with the case where provisioning starts from a point of time where the provisioning request is generated, provisioning can be completed at a high speed.

In the provisioning system of the present invention, the standby constructing unit predicts the generation of the provisioning, based on the load state of the server and statistical information of a past load state of the server. For example, if the provisioning is performed when a load of the server is heavy, it is possible to discover an indication, where the load of the server becomes heavy, from the load state of the server, before the load of the server actually becomes heavy. This indication is discovered from a correspondence relationship between the past generation situation of the provisioning request and the load state of the server, and the generation of the provisioning request is predicted based on the correspondence relationship, thereby predicting the future provisioning generation.

In the provisioning system of the present invention, the standby constructing unit calculates the probability of the provisioning request being generated for each application system after a predetermined time from a current point of time, based on the load state of the server and the statistical information of the past load state of the server, and predicts that the provisioning request is generated, when the calculated probability is a predetermined threshold value or more. The probability of the provisioning request being generated can be calculated using the logistic regression analysis. The probability of the provisioning request being generated after the predetermined time is calculated for each application system. When the probability of the provisioning request being generated becomes a predetermined threshold value or more for any application system, it is predicted that the provisioning request is generated in the future, and then the standby virtual machine starts. As a result, it is possible to prepare for provisioning which is generated in the future on the standby virtual machine and reduce a time needed for provisioning when the provisioning request is actually generated.

In the provisioning system of the present invention, the standby constructing unit can adopt a configuration that determines an application system becoming a target of provisioning that is previously executed on the standby virtual machine, based on the calculated probability and a state change cost graph indicating a time cost needed for switching between applications. A time that is needed for switching from one application system to another application system is previously calculated for each application system, and the state change cost graph is created. Based on the state change cost graph and the provisioning request generation probability of each application system, there is calculated an expectation value of a provisioning time of when each application system is assumed as a target of the previous provisioning that is performed on the standby virtual machine. If the application system whose expectation value is minimized is set as a target of the previous provisioning, a provisioning time of when the provisioning request is generated can be stochastically minimized.

In the provisioning system of the present invention, the standby constructing unit can adopt a configuration that executes at least a start of an OS and a start of an application on the standby virtual machine. Further, the standby constructing unit can adopt a configuration that executes an OS start, an application start, a setting change, a patch application, a network configuration change, registration setting to a managing/monitoring server, and registration setting to a joint server, on the standby virtual machine. In the provisioning that is performed on the standby virtual machine before a provisioning request is generated, processes which are preformed before the standby virtual machine activates the application system together with another server, that is, the OS start, the application start, the setting change, the patch application, the network configuration change, and the registration setting to a managing/monitoring server are performed. By performing these processes previously, when a provisioning request is generated, the system performs only a registering process of the standby virtual machine to the load balancer, or allocation of the sufficient resource amount to the standby virtual machine. As a result, provisioning can be completed and performed at a high speed.

In the provisioning system of the present invention, the standby constructing unit can adopt a configuration that uses a disk image stored in a shared disk to start an OS and an application on the standby virtual machine. In this case, since the OS and the application start using the disk image, it is possible to reduce the time that is needed to start the OS and the application.

In the provisioning system of the present invention, the standby constructing unit can adopt a configuration that refers to a schedule managing unit that stores a provisioning schedule defining a time when a provisioning request is generated, starts the standby virtual machine at a point of time before the time when the provisioning request is generated, and previously executes provisioning on the standby virtual machine. When the provisioning is performed in accordance with the predetermined schedule, the standby virtual machine starts, and the provisioning is previously performed at a point of time that is a predetermined time earlier than the time when the provisioning is scheduled. As a result, it is possible to prepare for the generation of the scheduled provisioning request and perform provisioning at a high speed.

In the provisioning system of the present invention, the provisioning executing unit can adopt a configuration that performs provisioning of the corresponding application system when a load state of a server that corresponds to any one of the two or more application systems exceeds a predetermined threshold value. In this case, for example, when an average load of the sever that configures the same application system exceeds a predetermined threshold value, provisioning is performed. As a result, a load of the server can be decreased, and a service quality of the application system can be prevented from being lowered.

In the provisioning system of the present invention, the provisioning executing unit can adopt a configuration that sets the resource amount allocated to the standby virtual machine to be larger than the resource amount allocated to the active virtual machine, and performs switching between the standby virtual machine and the active virtual machine. Before the provisioning is performed, the sufficient resource amount for the operation of the application is allocated to the active virtual machine. Meanwhile, the minimum resource amount is allocated to the standby virtual machine. When the provisioning is performed, the resource amount that is allocated to the active virtual machine is changed to the minimum resource amount, and the sufficient resource amount for the operation of the application is allocated to the standby virtual machine. In this way, the active virtual machine and the standby virtual machine are substantially switched, and the resource allocation amounts are changed. As a result it is possible to perform the application on the standby virtual machine.

In the provisioning system of the present invention, the provisioning executing unit can adopt a configuration that performs switching between the standby virtual machine and the active virtual machine, and starts an operation of the application system using the standby virtual machine when the application system subjected to provisioning is matched with the application system where provisioning is previously executed on the standby virtual machine by the standby constructing unit. When the provisioning is performed and the application system of the target of provisioning is matched with the application system where provisioning is previously performed on the standby virtual machine by the standby constructing unit, the sufficient resource amount is allocated to the standby virtual machine, and the active virtual machine and the standby virtual machine are switched. A registering process to the load balancer is executed and the operation of the application system is started on the standby virtual machine. As result, as compared with the case where provisioning is performed, the provisioning can be performed at a high speed.

In the provisioning system of the present invention, the provisioning executing unit can adopt a configuration that executes at least an OS start and an application start on the standby virtual machine, performs switching between the standby virtual machine and the active virtual machine after the OS start and the application start, and starts an operation of the application system using the standby virtual machine when the application system subjected to provisioning is mismatched with the application system where provisioning is previously executed on the standby virtual machine by the standby constructing unit. When the application system subjected to provisioning is mismatched with the application system where provisioning is previously executed on the standby virtual machine by the standby constructing unit, the OS and the application restart on the standby virtual machine. After additionally needed processes are executed on the standby virtual machine, the resource allocation amount of the active virtual machine and that of the standby virtual machine are changed, and the active virtual machine and the standby virtual machine are switched virtually. The operation of the application may start on the standby virtual machine.

In the provisioning system of the present invention, the provisioning executing unit can adopt a configuration that registers the standby virtual machine in a load balancer that performs a load balancing of the application system, and starts an operation of the application system using the standby virtual machine. In this case, the standby virtual machine as the server of the target of load balancing is registered in the load balancer, and the standby virtual machine can recognize the request from the user. As a result, the standby virtual machine is operated as a portion of the application system.

According to the provisioning method of the present invention, in the standby constructing step, the computer acquires a load state of the server that configures the application system, predicts whether a provisioning request is generated based on the acquired load state, and starts the standby virtual machine when it is predicted that the provisioning request is generated.

According to the provisioning method of the present invention, in the standby constructing step, the computer predicts the generation of the provisioning, based on the load state of the server and statistical information of a past load state of the server.

According to the provisioning method of the present invention, in the standby constructing step, the computer calculates the probability of the provisioning request being generated for each application system after a predetermined time from a current point of time, based on the load state of the server and the statistical information of the past load state of the server, and predicts that the provisioning request is generated, when the calculated probability is a predetermined threshold value or more.

According to the provisioning method of the present invention, in the standby constructing step, the computer determines an application system becoming a target of provisioning that is previously executed on the standby virtual machine, based on the calculated probability and a state change cost graph indicating a time cost needed for switching between applications.

According to the provisioning method of the present invention, in the standby constructing step, the computer executes at least a start of an OS and a start of an application on the standby virtual machine.

According to the provisioning method of the present invention, in the standby constructing step, the computer executes an OS start, an application start, a setting change, a patch application, a network configuration change, registration setting to a managing/monitoring server, and registration setting to a joint server, on the standby virtual machine.

According to the provisioning method of the present invention, in the standby constructing step, the computer uses a disk image stored in a shared disk to start an OS and an application on the standby virtual machine.

According to the provisioning method of the present invention, in the standby constructing step, the computer refers to a schedule managing unit that stores a provisioning schedule defining a time when a provisioning request is generated, starts the standby virtual machine at a point of time before the time when the provisioning request is generated, and previously executes provisioning on the standby virtual machine.

According to the provisioning method of the present invention, when a load state of a server that corresponds to the application system exceeds a predetermined threshold value, in the provisioning executing step, the computer performs provisioning of the corresponding application system.

According to the provisioning method of the present invention, in the provisioning executing step, the computer sets the resource amount allocated to the standby virtual machine to be larger than the resource amount allocated to the active virtual machine, and performs switching between the standby virtual machine and the active virtual machine.

According to the provisioning method of the present invention, in the provisioning executing step, when the application system subjected to provisioning is matched with the application system where provisioning is previously executed on the standby virtual machine in the standby constructing step, the computer performs switching between the standby virtual machine and the active virtual machine, and starts an operation of the application system using the standby virtual machine.

According to the provisioning method of the present invention, in the provisioning executing step, when the application system subjected to provisioning is mismatched with the application system where provisioning is previously executed on the standby virtual machine in the standby constructing step, the computer executes at least an OS start and an application start on the standby virtual machine, performs switching between the standby virtual machine and the active virtual machine after the OS start and the application start, and starts an operation of the application system using the standby virtual machine.

According to the provisioning method of the present invention, in the provisioning executing step, the computer registers the standby virtual machine in a load balancer that performs a load balancing of the application system, and starts an operation of the application system using the standby virtual machine.

According to the program of the present invention, in the standby constructing process, the computer acquires a load state of the server that configures the application system, predicts whether a provisioning request is generated based on the acquired load state, and starts the standby virtual machine when it is predicted that the provisioning request is generated.

According to the program of the present invention, in the standby constructing process, the computer predicts the generation of the provisioning, based on the load state of the server and statistical information of a past load state of the server.

According to the program of the present invention, in the standby constructing process, the computer calculates the probability of the provisioning request being generated for each application system after a predetermined time from a current point of time, based on the load state of the server and the statistical information of the past load state of the server, and predicts that the provisioning request is generated, when the calculated probability is a predetermined threshold value or more.

According to the program of the present invention, in the standby constructing process, the computer determines an application system becoming a target of provisioning that is previously executed on the standby virtual machine, based on the calculated probability and a state change cost graph indicating a time cost needed for switching between applications.

According to the program of the present invention, in the standby constructing process, the computer executes at least a start of an OS and a start of an application on the standby virtual machine.

According to the program of the present invention, in the standby constructing process, the computer executes an OS start, an application start, a setting change, a patch application, a network configuration change, registration setting to a managing/monitoring server, and registration setting to a joint server, on the standby virtual machine.

According to the program of the present invention, in the standby constructing process, the computer uses a disk image stored in a shared disk to start an OS and an application on the standby virtual machine.

According to the program of the present invention, in the standby constructing process, the computer refers to a schedule managing unit that stores a provisioning schedule defining a time when a provisioning request is generated, starts the standby virtual machine at a point of time before the time when the provisioning request is generated, and previously executes provisioning on the standby virtual machine.

According to the program of the present invention, when a load state of a server that corresponds to the application system exceeds a predetermined threshold value, in the provisioning executing process, the computer performs provisioning of the corresponding application system.

According to the program of the present invention, in the provisioning executing process, the computer sets the resource amount allocated to the standby virtual machine to be larger than the resource amount allocated to the active virtual machine, and performs switching between the standby virtual machine and the active virtual machine.

According to the program of the present invention, in the provisioning executing process, when the application system subjected to provisioning is matched with the application system where provisioning is previously executed on the standby virtual machine in the standby constructing process, the computer performs switching between the standby virtual machine and the active virtual machine, and starts an operation of the application system using the standby virtual machine.

According to the program of the present invention, in the provisioning executing process, when the application system subjected to provisioning is mismatched with the application system where provisioning is previously executed on the standby virtual machine in the standby constructing process, the computer executes at least an OS start and an application start on the standby virtual machine, performs switching between the standby virtual machine and the active virtual machine after the OS start and the application start, and starts an operation of the application system using the standby virtual machine.

According to the program of the present invention, in the provisioning executing process, the computer registers the standby virtual machine in a load balancer that performs a load balancing of the application system, and starts an operation of the application system using the standby virtual machine.

Effects of the Invention

In the provisioning system, method, and program of the present invention, provisioning is previously performed on the standby virtual machine that starts on the shared server, before provisioning is actually performed. When provisioning is requested, provisioning is performed by changing the resource amount that is allocated to the active virtual machine and the resource amount that is allocated to the standby virtual machine for allocating the sufficient resource amount to the standby virtual machine, and using the standby virtual machine to operate the application system. Before provisioning is actually performed, a preparation for provisioning is previously performed on the standby virtual machine that starts on the shared server, and a starting process of an OS and an application, a network configuration changing process, or a registration setting process to other servers are previously executed on the standby virtual machine. As a result, it is possible to perform provisioning of the server at a high speed, and to quickly perform provisioning of the server in response to an accidental load change or a failure occurrence. As a result, it is possible to maintain a service level (response performance and availability) of an application system that is operated in the data center or the information system in the enterprise. Further, since the provisioning can be performed at a high speed by constructing the standby virtual machine in the shared server, the system does not require a SAN configuration. Thereby, it is possible to quickly perform provisioning of the server by effectively using the existing server resource and to reduce a cost of the entire system.

BEST MODE FOR CARRYING OUT THE INVENTION

Hereinafter, the preferred embodiments of the present invention will be described with reference to the accompanying drawings. FIG. 1 shows a configuration of a provisioning system according to a first exemplary embodiment of the present invention. A provisioning system 10 includes a load balancer 11, a managing server 20, a plurality of servers (first to sixth servers) 31 to 36 that are used to execute an application system, and a shared server (seventh server) 40. The servers 31 to 36 operate two or more application systems. In an example shown in FIG. 1, the servers 31 and 32 operate an application system of AP1, and the servers 33 and 34 operate an application system of AP2. Further, the servers 35 and 36 operate an application of AP3.

The shared server 40 includes a virtual machine monitor 43. The virtual machine 43 configures virtual machines (an active virtual machine 41 and a standby virtual machine 42) on the shared server 40. The virtual machine 43 is software that operates on the shared server 40, and constructs/removes the virtual machine or allocates resources to the virtual machine. The active virtual machine 41 is operated as a portion of an application system, and a sufficient amount of resources (a CPU, a memory, and an I/O band) are allocated for an operation of an application, by the virtual machine monitor 43. In the example shown in FIG. 1, the active virtual machine 41 operates the application system of the AP3 together with the servers 35 and 36. A standby virtual machine 42 is used as an environment for previously preparing an application system which has the high possibility of a provisioning request being generated, and the virtual machine monitor 43 allocates a minimum resource amount smaller than a resource amount allocated to the active virtual machine 41.

The load balancer 11 performs a load balancing on a request from a client for each application system. The managing server 20 includes an information monitoring unit 21, a standby construction determining unit 22, a provisioning determining unit 23, and a control executing unit 24. The load balancer 11 manages a configuration change of the system in accordance with a change in load of the application system or a failure in the application system. The information monitoring unit 21 monitors the configuration or performance and the failure of the entire system. The control executing unit 24 executes control on the shared sever 40 and the load balancer 11 or a network apparatus (not shown). The standby construction determining unit 22 predicts a generation of a provisioning request, constructs the standby virtual machine 42 on the shared server 40 through the control executing unit 24, and executes provisioning on the standby virtual machine 42.

The standby construction determining unit 22 predicts a provisioning request of each application system, from the load change or the past statistical data. Specifically, the standby construction determining unit 22 calculates the probability of the provisioning request being generated after five minutes for each application system, from the load change or the past statistical data. When the calculated probability exceeds a predetermined threshold value, the standby construction determining unit 22 executes provisioning on the standby virtual machine 42 in preparation for the provisioning request that is generated in the future.

The provisioning determining unit 23 determines whether the provisioning request is generated based on the load state in the current system, and executes provisioning on the shared server 40 through the control executing unit 24. If the provisioning determining unit 23 detects that an average utilization coefficient of the application exceeds 80%, the provisioning determining unit 23 generates a provisioning request and determines to add a server. When the provisioning is not performed in advance on the standby virtual machine 42 or a target of provisioning is an application system that is different from an application system on which the provisioning is previously performed, provisioning is first performed on the standby virtual machine 42.

FIG. 2 shows an operation sequence of when a standby construction determining unit 22 previously performs provisioning on a standby virtual machine 42. The standby construction determining unit 22 acquires a current system state, for example, a CPU average utilization coefficient of a server in each application system or an average value of a disk I/O, and an average value of a network I/O (Step S1000), using the information monitoring unit 21. The standby construction determining unit 22 collates the acquired system state and the past statistical data, and predicts whether a provisioning request to an application system is generated (Step S1001). Specifically, in Step S1001, from a predetermined calculation equation that is acquired from the past statistical data and the current system state, the standby construction determining unit 22 calculates the probability of a provisioning request being generated for each application system.

The standby construction determining unit 22 determines whether the probability of the provisioning request being generated is high, from the prediction result in Step S1001 (Step S1002). In Step S1002, for example, when the probability of the provisioning request being generated from any application system is a predetermined threshold value or more, the standby construction determining unit 22 determines that the possibility of the provisioning request being generated is high. When the standby construction determining unit 22 determines that the probability of the provisioning request being generated is low, the standby construction determining unit 22 maintains a waiting state for a predetermined time (Step S1005), and returns to Step S1000. Then, the standby construction determining unit 22 confirms the system state again.

If it is determined that the probability of the provisioning request being generated is high, the standby construction determining unit 22 determines a standby state for provisioning (Step S1003). When the standby state is determined, the method disclosed in Patent Document 2 can be used, which will be specifically described in the exemplary embodiments. Then, based on the standby state that is determined in Step S1003, the standby construction determining unit 22 constructs the standby virtual machine 42 in the shared server 40 through the control executing unit 24 before a condition of performing provisioning is actually realized. Then, the standby construction determining unit 22 executes a portion of provisioning on the constructed standby virtual machine 42 (Step S1004).

In Step S1004, the standby construction determining unit 22 performs switching of an OS in the standby virtual machine 42 or application setup, and a setting change of a network. However, the resource amount that is allocated to the standby virtual machine 42 is a minimal amount, and the standby virtual machine 42 does not have an ability of receiving a request from a client and providing a service. For this reason, the standby virtual machine 42 only maintains a standby state, and is not used when an application system is actually operated.

FIG. 3 shows an operation sequence of when a provisioning determining unit 23 determines to perform provisioning. The provisioning determination operation is performed differently from a previous provisioning operation of the standby virtual machine 42 shown in FIG. 2. The provisioning determining unit 23 acquires the current system state from the information monitoring unit 21 (Step S2000). After confirming the state, the provisioning determining unit 23 determines whether provisioning is performed based on previously programmed or ruled control (Step S2001). For example, if it is detected that an average CPU utilization of any application system exceeds a predetermined threshold value, the provisioning determining unit 23 determines to perform provisioning. When it is determined that provisioning is not performed, the provisioning determining unit 23 maintains a waiting state for a predetermined time (Step S2006). Then, the provisioning determining unit 23 returns to Step S2000 and confirms the system state again.

When determining to perform provisioning, the provisioning determining unit 23 generates provisioning plan indicating what sequence the provisioning is performed, based on system configuration information and a configuration of a server (Step S2002). When the provisioning plan is generated, the provisioning determining unit 23 refers to system configuration information, specifies the used OS or application, and generates a sequence of OS switching or application setup. Further, in case of the system configuration that divides a network using a VLAN, a sequence of performing a setting change of the VLAN is added to provisioning plan.

The provisioning determining unit 23 informs a manager with an alert that provisioning is needed (Step S2003). The provisioning determining unit 23 determines whether the manager consents to a provisioning plan (Step S2004). When the manager consents to the provisioning plan, the provisioning determining unit 23 executes provisioning on the control executing unit 24 (Step S2005). When the manager does not consent to the provisioning plan, the provisioning is not performed. The consent by the manager can be omitted.

FIG. 4 shows an operation sequence of when provisioning is executed. First, the control executing unit 24 confirms a state of the standby virtual machine 42 (Step S3000). In Step S3000, the control executing unit 24 determines whether an application system on the standby virtual machine 42 that is constructed in Step S1004 of FIG. 2 is matched with an application system which is a target of provisioning (Step S3001). When the application system in the standby virtual machine is matched with the application system which is the target of provisioning, the control executing unit 24 controls the virtual machine monitor 43, and changes the resource amount allocated to the active virtual machine 41 and the resource amount allocated to the standby virtual machine 42 in accordance with the provisioning plan that is generated in Step S2002 (FIG. 3). (Step S3008).

During the change of the resource allocation amount of Step S3008, the control executing unit 24 reduces the resource amount of the active virtual machine 41 and allocates the sufficient resource amount to the standby virtual machine 42. In this way, the standby virtual machine 41 and the standby virtual machine 42 are substantially switched. If the sufficient resource amount is allocated to the standby virtual machine 42, the application system in a standby state on the standby virtual machine 42 can start a service. After the sufficient resource amount is allocated to the standby virtual machine 42, the control executing unit 24 registers the standby virtual machine 42 as a server which is a target of load balancing in the load balancer 11, and the standby virtual machine 42 starts request reception from the client (Step S3009). The standby virtual machine 42 is operated as a portion of the application system, and provisioning is completed.

Meanwhile, when it is determined that the application system on the standby virtual machine 42 is mismatched with the application system which is the target of the provisioning execution, the control executing unit 24 executes a common provisioning process in accordance with the provisioning plan that is generated in Step S2002 (FIG. 3). That is, the control executing unit 24 investigates whether there is an application that has already started on the standby virtual machine 42 (Step S3002). When there is the application, the control executing unit 24 stops the application (Step S3003). Then, the control executing unit 24 switches the OS (Step S3004), executes a setup process of an application (Step S3005), executes a setting changing process of a network apparatus to change the network configuration (Step S3006), and executes a registration process to the managing server 20 (Step S3007). Further, in Step S3008, the control executing unit 24 changes the resource amount that is allocated to the standby virtual machine 42 and executes a registration process to the load balancer 11 in Step S3009.

An aspect of a state change of an application system in the shared server 40 will be described with reference to FIG. 5. First, in the active virtual machine 41, the application system of the AP3 is operated and the standby virtual machine 42 enters in a stop state (FIG. 5A). In this state, if the load of the application system of the AP1 is increased, it is predicted that a provisioning request is generated for the AP1 in accordance with the sequence shown in FIG. 2, and the application system of AP1 is constructed on the standby virtual machine 42 (FIG. 5B). However, in this state, since the standby virtual machine 42 does not receive the request from the client, the provisioning is not completed.

If the load of the application system of the AP1 is increased and the provisioning request for the AP1 is generated (Step S2001 of FIG. 3), in this provisioning, the procedure proceeds from Step S3001 of FIG. 4 to Step S3008, and the resource allocation amount of the active virtual machine 41 is reduced. If the sufficient resource amount is allocated to the standby virtual machine 42, the standby virtual machine 42 enters in an active state where the application system can be operated, and the active virtual machine 41 enters in a standby state. That is, the active virtual machine 41 and the standby virtual machine 42 are substantially switched (FIG. 5C). Then, if the standby virtual machine 42 where the application of the AP1 is operated is registered as a target of load balancing in the load balancer 11, the standby virtual machine 42 that becomes an active state can be used from the client and the provisioning is completed.

In this embodiment, in the shared server 40, the active virtual machine 41 and the standby virtual machine 42 are constructed using the virtual machine monitor 43. When the provisioning is predicted, the managing server 20 previously executes a portion of the provisioning on the standby virtual machine 42. When the provisioning needs to be actually performed, the resource allocation amount for the standby virtual machine 42 is changed and the standby virtual machine is used for operation of the application system, such that the provisioning is performed. As such, if the portion of the provisioning is previously executed on the standby virtual machine 42 that is configured to be separated from the active virtual machine 41 which performs the operation of the application system on the shared server 40, the provisioning can be performed at a high speed.

In this embodiment, since the provisioning can be quickly performed on previously performing the portion of the provisioning on the standby virtual machine 42, at the time of the accidental load change or failure occurrence, the provisioning of the server can be quickly executed and the load reduction or switching of the failure serve can be performed. As a result, it is possible to increase availability in a data center or an information system in an enterprise. Further, by performing the provisioning, it is possible to maintain a service level (response performance and availability) of an application system that is operated in the data center or the information system in the enterprise.

In this embodiment, the virtual machine monitor 43 is installed in the existing server and the plurality of virtual machines are constructed on the server, thereby realizing high-speed provisioning. For this reason, the provisioning can be performed at a high speed without changing the entire system. Further, in this embodiment, a standby state can be constructed on the server that operates as a portion of the application system, and a standby server does not need to be newly installed. Accordingly, the existing server resource can be effectively used, and a cost of the entire system can be reduced.

Hereinafter, the operation of a provisioning system according to this embodiment will be described using a specific exemplary embodiment. FIG. 6 shows the configuration of a provisioning system according to this embodiment. The provisioning system is configured as a provisioning system in a data center in an enterprise, and includes a load balancer 100, a VLAN switch 101, a firewall 102, a managing/monitoring server 103, servers (first to sixth servers) 111 to 116, and database servers 131 to 133. The servers 111 to 115 correspond to the servers (servers 31 to 36 in FIG. 1) that are used for an application system, and the server 116 corresponds to a server (shared server 40) that can configure a virtual machine by the virtual machine monitor 120.

In the system shown in FIG. 6, three Web application systems of a sales management, a sales analysis, and a development evaluation are operated. The servers 111 and 112 are used as servers for a sales management, the servers 113 and 114 are used as servers for a sales analysis, and the server 115 is used as a server for a development evaluation. The server 116 that is a pool server is commonly used as a portion of the development evaluation system. However, when the load of the sales management or the sales analysis is increased or decreased, or the failure is occurred, the server 116 is used as a server for a sales management or a sales analysis. The data that is used by each application is stored in the database servers 131 to 133 that are connected to the same network.

The application of sales management and sales analysis applications execute a load balancing process of a request from a client through the load balancer 100. Further, In FIG. 6, it is assumed the case where an operation management group of each application is different and each application system is isolated on the network by the VLAN switch 101 and the firewall 102. The monitoring and managing operation of the entire system is performed by the managing/monitoring server 103. The managing/monitoring server 103 corresponds to the managing server 20 in FIG. 1, and configures the standby virtual machine or determines and executes provisioning.

When considering a situation: where the number of users of a sales management system and an access frequency are increased at the end of the month; and sufficient response performance is not obtained in a process ability of the servers 111 and 112, the managing/monitoring server 103 detects a high load state of the sales management system and determines to perform provisioning on the server 116 as the sales management system. The load balancing is performed by three servers of the servers 111, 112 and the added server 116. Thereby, it is possible to maintaining response performance of the sales management system. In this embodiment, a generation of the provisioning request is predicted before the provisioning request is generated. When the provisioning request is predicted, at the point of time, provisioning previously starts on the standby virtual machine 122. As a result, it is possible to perform provisioning at a high speed.

The provisioning prediction will be described below. In the case where the provisioning is executed when an average CPU utilization of a server configuring the same application system exceeds 80%, it is possible to discover any indication from a variation of the resource state in the system before the average CPU utilization exceeds 80%. Accordingly, a pattern of a provisioning request generation is extracted from variation data of a past resource state, and then provisioning is predicted using the pattern. During the extraction of the pattern of the provisioning request generation, for example, by inputting a pseudo client request to each application system, resource state data, such as a CPU utilization, a disk I/O, a network I/O, and a client connection number of each server, is extracted with a proper window size (for example, 5 seconds), and existence or non-existence of a provisioning request generation x seconds (for example, one minute) after data series are observed is extracted as a pattern of the provisioning request generation.

FIG. 7 shows a performance feature vector and a pattern of a provisioning request generation. Data that is obtained by extracting resource state data with a proper window size is defined as a performance feature vector. FIG. 7A shows an example of a performance feature vector. In this example, for each of a sales management, a sales analysis, and a development evaluation, an average value of a CPU utilization and an average value of a disk I/O are defined as data (x1 to x6) of a performance feature vector. In this case, the average value is used as the performance feature vector data, but another statistical value or difference may be used as a performance feature vector.

During the extraction of the pattern of the provisioning request generation, a set of observation data of a performance feature vector and existence and non-existence of a generation of a provisioning request after a predetermined time from the data is observed (application system becoming an target in the case of the provisioning request generation) is extracted as a pattern (FIG. 7B). FIG. 7B shows the case in which a provisioning request is generated for an application system of a sales management after a predetermined time from the following data is observed: a CPU utilization in a sales management is "70.6", a disk I/O is "152.8", a CPU utilization in a sales analysis is "5.4", a disk I/O is "8", a CPU utilization in a development evaluation is "9.4", and a disk I/O is "173.6".

Next, there is prepared a model where a provisioning request is predicted based on the extracted pattern data. As an example, a method using a logistic regression analysis is shown. The logistic regression analysis is an analysis method that is used when a ratio or a binary variable value is estimated using a number of description variables. The case where provisioning is requested is set as "1" and the case where the provisioning is not requested is set as "0", and the probability q of the provisioning being requested for each application is estimated. As a description variable, a performance feature vector v (FIG. 7A) using pattern data is used.

A general equation of a logistic regression analysis is defined as follows.

$$v=(x1, x2, \ldots, xn)$$

$$q(v)=\exp(\beta 0+\Sigma \beta i \times xi)/(1+\exp(\beta 0+\Sigma \beta i \times xi))$$

In this case, $\beta 0, \ldots,$ and $\beta n$ are a regression coefficient, and can be calculated by a maximum likelihood method using pattern data (FIG. 7B) as input data. An example of a logistic regression equation is shown as follows for sales management system after the regression coefficient is obtained.

$$f(v)=\exp(-2.6+1.04 \times x1+0.17 \times x2-6 \times x3+0.03 \times x4+0.38 \times x5+0.17 \times x6)$$

$$q(v)=f(v)/(1+f(v)) \quad (1)$$

For each application system, similar to the above case, a calculation equation of a probability of provisioning being required is derived by a logistic regression analysis. Further, even in the case where a provisioning is not required for any application system, a calculation equation of the probability is derived using the logistic regression analysis. The derivation of the probability calculation equation is previously performed before starting to operate the provisioning system.

The standby construction determining unit 22 generates a performance feature vector corresponding to a current system state that is acquired from the information monitoring unit 21 in Step S1000 of FIG. 2, applies the performance feature vector to the derived probability calculation equation in Step S1001, and calculates the probability of the provisioning request being generated for each application system. When the probability of the provisioning request being generated for the sales management system exceeds a predetermined threshold value, for example, 0.85, the procedure proceeds from Step S1002 to Step S1003, and a standby state for provisioning is determined.

In the determination of the standby state, from the selectable standby state, a process time that is needed when each application system is subjected to provisioning is previously measured or predicted and a state change cost graph is previously created. Based on the state change cost graph and the probability of a provisioning request of each application being generated, an application system that is subjected to provisioning is determined by the standby virtual machine 122. FIG. 8 shows a specific example of a state change cost graph. In the same drawing, when the current application system is a sales management system, in order to switch the application system into the sales analysis system, a temporal cost is "49".

FIG. 9 shows the probability of a provisioning request generation that is calculated for each application system. FIG. 10 shows a calculation result of an expectation provisioning time. It is assumed that the probability of provisioning request generation of each application system calculated in Step S1001 is "0.92" in a sales management, "0.21" in a sales analysis, and "0.01" in a development evaluation, and the probability of non-generation of the provisioning request is "0.34" (FIG. 9A). In this case, in the determination of the standby state, each probability is divided by a total sum of the probabilities and a ratio of the probability of the provisioning request generation is calculated. If the ratio of the provisioning request generation probability is calculated, a request ratio for the sales management is calculated as "0.62", a request ratio for a sales analysis is calculated as "0.14", a request ratio for a development evaluation is calculated as "0.006", and a request ratio for no provisioning request is calculated as "0.23" (FIG. 9B).

If the ratio of the provisioning request generation probability is calculated, a sum of products of a ratio of the provisioning request generation probability of each application system and a state change cost (FIG. 8) is taken with respect to a selectable standby state, and an expectation provisioning time is calculated. For example, in the case where the standby virtual machine 122 is subjected to provisioning in a sales management, a total sum of the following values are calculated: the value where a time cost "0" needed when switching is made from a sales management to a sales management is multiplied by a request ratio "0.62" of the sales management; the value where a time cost "60" needed when switching is made from a sales management to a sales analysis is multiplied by a request ratio "0.14" of the sales analysis; and the value where a time cost "50" needed when switching is made from a sales management to a development evaluation is multiplied by a request ratio "0.0006" of the development evaluation. If the expectation provisioning time is calculated including the case where no application system performs provisioning for the standby virtual machine 122, a calculation result shown in FIG. 10 is obtained.

In the determination of the standby state, from the calculation result of the expectation provisioning time, an application system which has the shortest expectation provisioning time is selected as a standby state, that is, an application system that is subjected to provisioning on the standby virtual machine 122. In an example shown in FIG. 10, when the standby state is set as the application system for the sales management, the expectation provisioning time is reduced. Therefore, the standby state is determined for the sales management. Then, in Step S1004, the standby virtual machine 122 is constructed, and the application system for the determined sales management is subjected to provisioning on the constructed standby virtual machine 122. During the provisioning, a switching process of an OS, a setup process of the application for the sales management, a setting changing process of the VLAN switch 101 or the firewall 102, a registering process to the managing/monitoring server 103, and a registering process to the database servers 131 to 133 are executed.

After the standby state is constructed, if it is detected that the an average CPU utilization of the servers 111 and 112 exceeds 80% in Step S2001 of FIG. 3, the procedure proceeds to Step S2002, and actual provisioning starts. In this case, the server 116 becomes a target of provisioning. In the generation of the provisioning plan of Step S2002, in order to confirm the system configuration and perform provisioning of the server 116 as the application system for the sales management, it is determined that it is needed to execute the switching process of the OS, the setup process of the AP, the setting changing process of the VLAN switch 101 and the firewall 102, the registering process to the managing/monitoring server 103, and the registering process to the database servers 131 to 133, and thus these processes are planned.

A detailed provisioning sequence of the planned provisioning is based on a sequence shown in FIG. 4. In Step S3000, the standby state is confirmed, and it is determined by the standby virtual machine 122 whether the application system for the sales management is previously subjected to provisioning. When it is determined that the application system for the sales management is previously subjected to provisioning, the switching process of the OS, the setup process of the AP, the setting changing process of the VLAN switch 101 and the firewall 102, the registering process to the managing/monitoring server 103, and the registering process to the database servers 131 to 133 are previously performed. Accordingly, provisioning is completed by only a change in the resource amount of the active virtual machine 121 and that of the standby virtual machine 122 in Step S3008, and the setting change of the load balancer 100 in Step S3009.

FIG. 11 shows the configuration of a provisioning system according to a second exemplary embodiment of the present invention. A provisioning system 10a according to this embodiment includes a shared disk device 50 using an SAN or a NAS (Network Attached Storage), in addition to the configuration of the provisioning system 10 according to the first exemplary embodiment. OS images that configure each application system are stored in the shared disk device 50. The servers 31 to 36 use shared disk images that are stored in the shared disk device 50 and starts an application system. The operation of constructing a standby virtual machine by the standby construction determining unit 22 according to this embodiment and the operation of determining provisioning by the provisioning determining unit 23 are the same as the operations according to the first exemplary embodiment (FIGS. 2 and 3).

FIG. 12 shows an execution sequence of provisioning. First, the control executing unit 24 confirms a state of the standby virtual machine 42 (Step S5000). In Step S5000, the control executing unit 24 determines whether the application system in the standby virtual machine 42 constructed in Step S1004 of FIG. 2 is matched with an application system of a target of provisioning execution (Step S5001). When it is determined that the application systems are matched with each other, the control executing unit 24 controls the virtual machine monitor 43, and changes the resource amount that is allocated to the active virtual machine 41 and the resource amount that is allocated to the standby virtual machine 42 (Step S5007).

In Step S5007, the control executing unit 24 reduces the resource amount of the active virtual machine 41 and allocates the sufficient resource amount to the standby virtual machine 42. In this way, the active virtual machine 41 and the standby virtual machine 42 are switched. If the sufficient resource amount is allocated to the standby virtual machine 42, the application system that is in a standby state on the standby virtual machine 42 enters in a state where a service starts. After the sufficient resource amount is allocated to the standby virtual machine 42, the standby virtual machine 42 is registered as a server being a target of load balancing in the load balancer 11. As a result, the standby virtual machine 42 starts request reception from the client (Step S5008). The standby virtual machine 42 is operated as a portion of the application system, so that provisioning is completed.

Meanwhile, when it is determined that the application system in the standby virtual machine 42 is mismatched with the application system of the target of provisioning execution in Step S5000, the control executing unit 24 executes a common provisioning process. That is, the control executing unit 24 investigates whether there is an application that previously starts on the standby virtual machine 42 (Step S5002). When it is determined that there is the application that previously starts, the control executing unit 24 stops the application (Step S5003).

After the application is stopped, the control executing unit 24 designates a disk image of an OS including the configured application system that is stored in the shared disk device 50, and starts the application system by a remote boot (Step S5004). Then, the control executing unit 24 changes setting of the network apparatus and changes the network configuration (Step S5005), and executes a registering process to the managing server 20 (Step S5006). Further, in Step S5007, the control executing unit 24 changes the resource amount that is allocated to the standby virtual machine 42 and executes a registering process to the load balancer 11 in Step S5008.

In this embodiment, the control executing unit 24 shares a disk image that is configured as the application system and performs provisioning by a remote boot. Thereby, as compared with the case where the OS or the application is switched and a setup process is divisionally executed, provisioning can be performed at a high speed. However, as the shared disk device 50, a storage device, such as a SAN or a NAS, is needed. The other effect is the same as that of the first exemplary embodiment.

FIG. 13 shows the configuration of a managing server in a provisioning system according to a third exemplary embodiment of the present invention. The provisioning system according to this embodiment has the configuration where the managing server 20 shown in FIG. 1 is replaced by a managing server 20a shown in FIG. 13. The managing server 20a in the provisioning system according to this embodiment includes a schedule input unit 25, a schedule managing unit 26, and a time monitoring unit 27, in addition to the configuration of the managing server 20 shown in FIG. 1. In this embodiment, provisioning is executed in accordance with a previously determined schedule, not a current system state.

The schedule input unit 25 registers a schedule that is input by the manager and that requires provisioning in the schedule managing unit 26. The standby construction determining unit 22 collates the schedule that is registered in the schedule managing unit 26 and the current time that is acquired from the time monitoring unit 27. If the current time is a predetermined time earlier than the scheduled date and time, the standby construction determining unit 22 constructs the standby virtual machine 42 (FIG. 1), and executes a portion of provisioning on the standby virtual machine 42. Further, the provisioning determining unit 23 collates the schedule that is registered in the schedule managing unit 26 and the current time that is acquired from the time monitoring unit 27. If the current time is the scheduled date and time, the provisioning determining unit 23 executes provisioning using the standby virtual machine 42.

FIG. 14 shows an operation sequence of when a standby construction determining unit 22 previously performs provisioning on a standby virtual machine 42. First, as a process of a preparation stage, the manager uses the schedule input unit 25 to set a schedule to execute provisioning (Step S6000). An example of an input schedule is shown in FIG. 15. The schedule includes at least information of a date and time when provisioning is required, a shared server that becomes a target, and a required application system. Next, the standby construction determining unit 22 starts to monitor a time (Step S6001), and determines whether a preparation of provisioning is needed based on the schedule that is registered in the schedule managing unit 26 and the current time that is provided by the time monitoring unit 27 (Step S6002).

In Step S6002, for example, if the current time becomes 10 minutes earlier than the scheduled date and time, the standby construction determining unit 22 determines that the preparation is needed. When it is determined that the preparation is not needed, the standby construction determining unit 22 maintains a waiting state for a predetermined time (Step S6004), and returns to Step S6002. When it is determined that the preparation of the provisioning is needed, the standby construction determining unit 22 starts the configuration of the standby virtual machine 42 through the control executing unit 24 (Step S6003). In Step S6003, similar to Step S1004 of FIG. 2, the standby construction determining unit 22 executes a portion of provisioning on the constructed standby virtual machine 42. At this time, the standby construction determining unit 22 sets up the application designated by the schedule on the standby virtual machine 42.

FIG. 16 shows an operation sequence of when provisioning is executed. After the schedule is input (Step S6000 of FIG. 14), the provisioning determining unit 23 starts to monitor a time (Step S7000), and determines whether provisioning is needed, based on the schedule that is registered in the schedule managing unit 26 and the time information that is provided by the time monitoring unit 27 (Step S7001). In Step S7001, if the current time becomes the scheduled date and time, the provisioning determining unit 23 determines that provisioning is needed. If the current time is earlier than the scheduled date and time, the provisioning determining unit 23 determines that provisioning is not needed, and maintains a waiting state for a predetermined time (Step S7004). Then, the provisioning determining unit 23 returns to Step S7001.

If the current time becomes the scheduled date and time, the provisioning determining unit 23 executes provisioning. In this embodiment, before the scheduled date and time, the standby construction determining unit 22 previously executes a portion of provisioning on the standby virtual machine 42. Therefore, during the execution of provisioning, a changing process of the resource amounts of the active virtual machine 41 (FIG. 1) and the standby virtual machine 42 and a registering process of the standby virtual machine 42 to the load balancer 11 are executed (Steps S7002 and S7003). In Step S7002, if the resource amounts are changed, the active virtual machine and the standby virtual machine are switched. Then, in Step S7003, a registering process to the load balancer 11 is executed, and the standby virtual machine 42 receives the user request. As a result, provisioning is completed.

In this embodiment, a standby state is previously constructed in the standby virtual machine 42 based on the schedule. If the current time becomes the date and time designated by the schedule, the resource amount of the active virtual machine 41 and the resource amount of the standby virtual machine 42 are changed, and provisioning is performed. Thereby, it is possible to quickly switch the application system at the scheduled date and time. At this time, if the active virtual machine 41 is operated until the date and time designated by the schedule, it is possible to operate the shared server 40 (FIG. 1) as a portion of the application system. When the load change can be previously predicted in the system that continues the operation during a long period, it is possible to effectively perform the operation by previously designating the schedule of the provisioning.

In the above embodiments, the configuration where the provisioning system includes one shared server 40 that becomes the target of provisioning has been described. However, the number of the shared server 40 is not limited to one, and a plurality of servers can be constructed as the shared server 40 that includes the virtual machine monitor 43. Further, a combination of the above embodiments may be used. For example, a combination of the configuration of the second exemplary embodiment and the configuration of the third exemplary embodiment can be used. In the third exemplary embodiment, provisioning is controlled by the schedule. However, while the schedule is preferentially used, in a time zone where the schedule does not exist, similar to the first exemplary embodiment, provisioning by the provisioning prediction is performed, thereby effectively using the shared server 40 to the maximum.

The present invention has been described based on the preferred embodiments. However, the provisioning system, method, and program of the present invention are not limited to the above-described embodiments, and various changes and modifications of the configurations of the embodiments are included in the range of the present invention.

This application is the National Phase of PCT/JP2008/050173, filed Jan. 10, 2008, which is based upon and claims the benefit of priority from Japanese patent application No. 2007-003823, filed on Jan. 11, 2007, the disclosure of which is incorporated herein in its entirety by reference.

INDUSTRIAL APPLICABILITY

The present invention can be applied for management middleware that synthetically manages and operates a system including a virtual machine. According to the present invention, since provisioning can be performed at a high speed, resources can be effectively used while maintaining an SLA of an application system and a cost of the entire system can be decreased.

BRIEF DESCRIPTION OF THE DRAWINGS

FIGS. 5A to 5C are block diagrams illustrating an aspect of a state change of an application system in a shared server.

FIG. 6 is a block diagram illustrating the configuration of a provisioning system according to an exemplary embodiment.

FIG. 7A is a diagram illustrating a performance feature vector and

FIG. 7B is a diagram illustrating a pattern of a performance feature vector and a provisioning request generation.

FIGS. 9A and 9B are diagrams illustrating a generation probability of a provisioning request that is calculated for each application system.

FIG. 10 is a diagram illustrating a calculation result of an expectation provisioning time.

FIG. 11 is a block diagram illustrating the configuration of a provisioning system according to a second exemplary embodiment of the present invention.

FIG. 12 is a flowchart illustrating an execution sequence of provisioning according to a second exemplary embodiment.

FIG. 13 is a block diagram illustrating the configuration of a managing server in a provisioning system according to a third exemplary embodiment of the present invention.

FIG. 14 is a flowchart illustrating an operation sequence of previous provisioning according to a third exemplary embodiment.

DESCRIPTION OF REFERENCE NUMERALS

Figure 1:
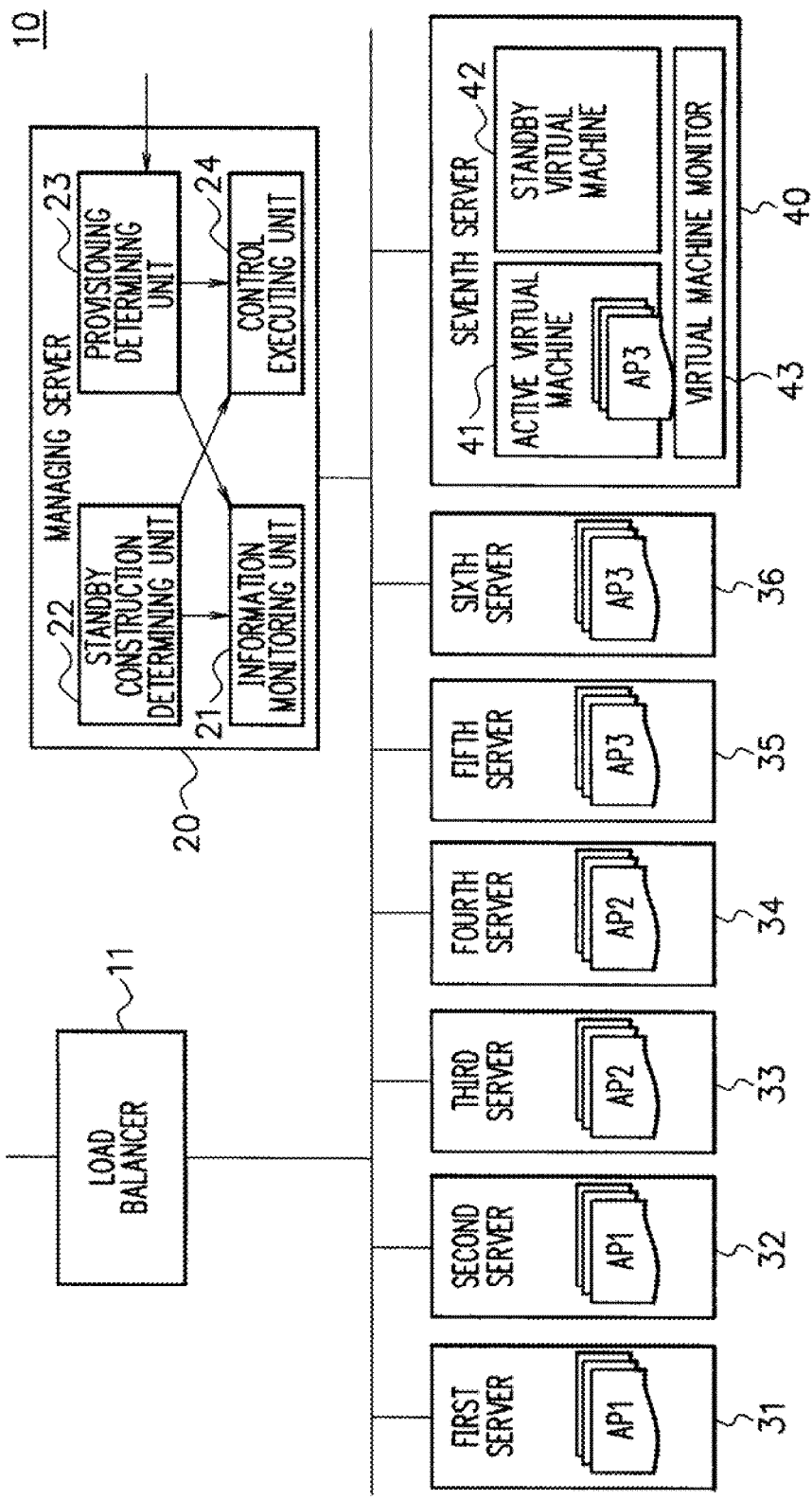
FIG. 1 is a block diagram illustrating the configuration of a provisioning system according to a first exemplary embodiment of the present invention.
Figure 2:
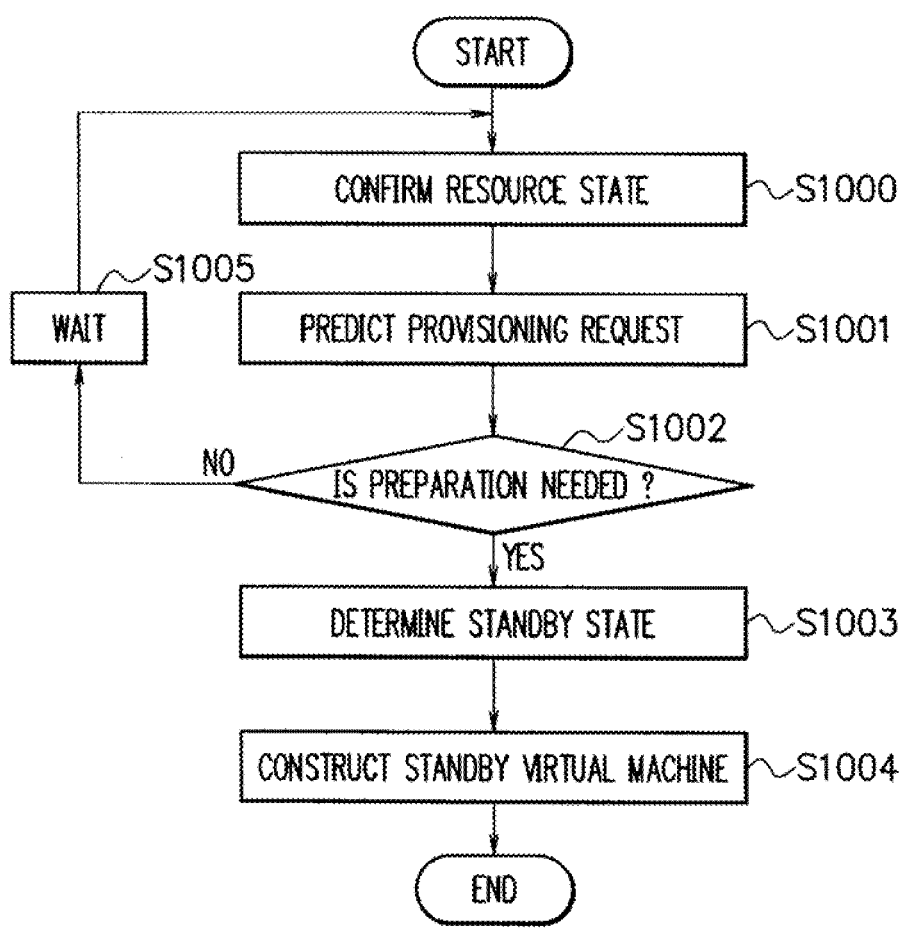
FIG. 2 is a flowchart illustrating an operation sequence of when a standby construction determining unit previously performs provisioning on a standby virtual machine.
Figure 3:
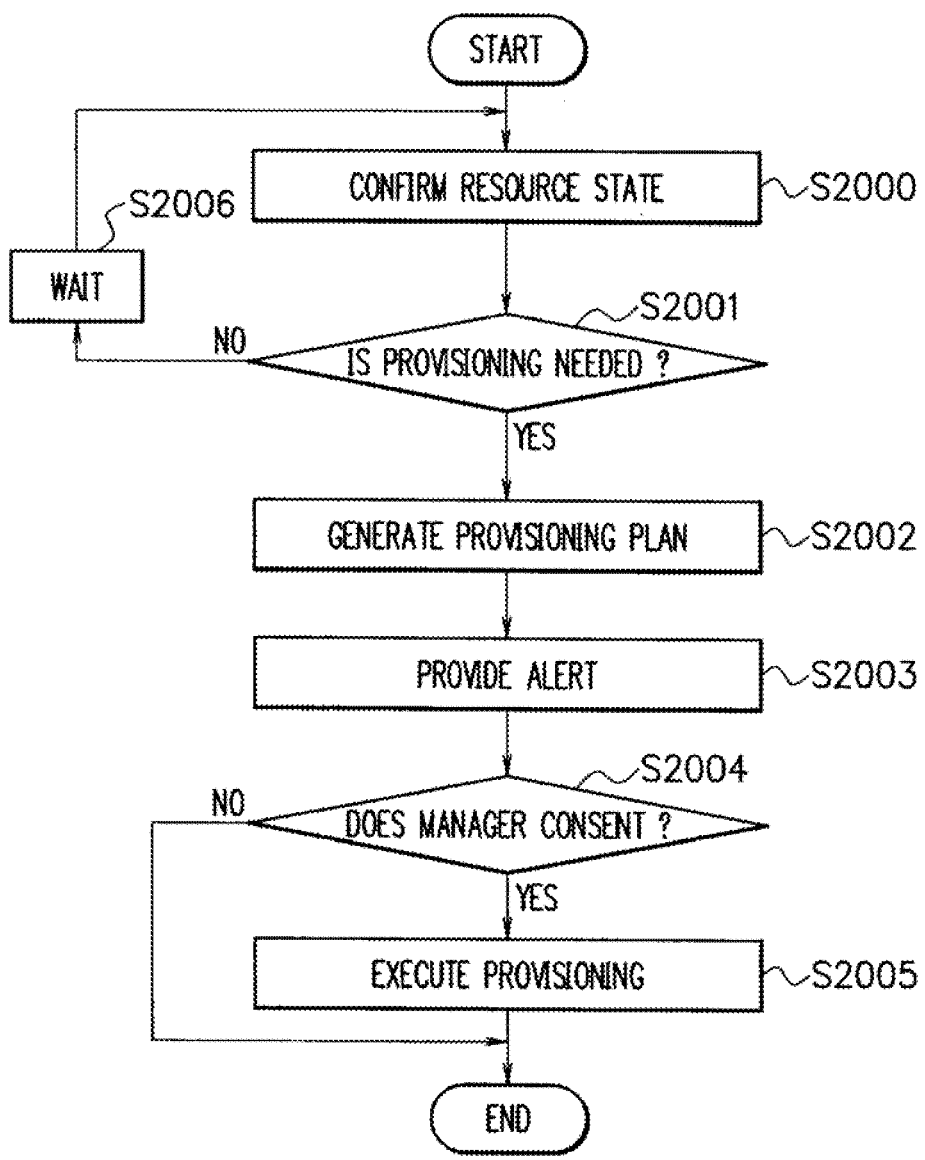
FIG. 3 is a flowchart illustrating an operation sequence of when provisioning is determined by a provisioning determining unit.
Figure 4:
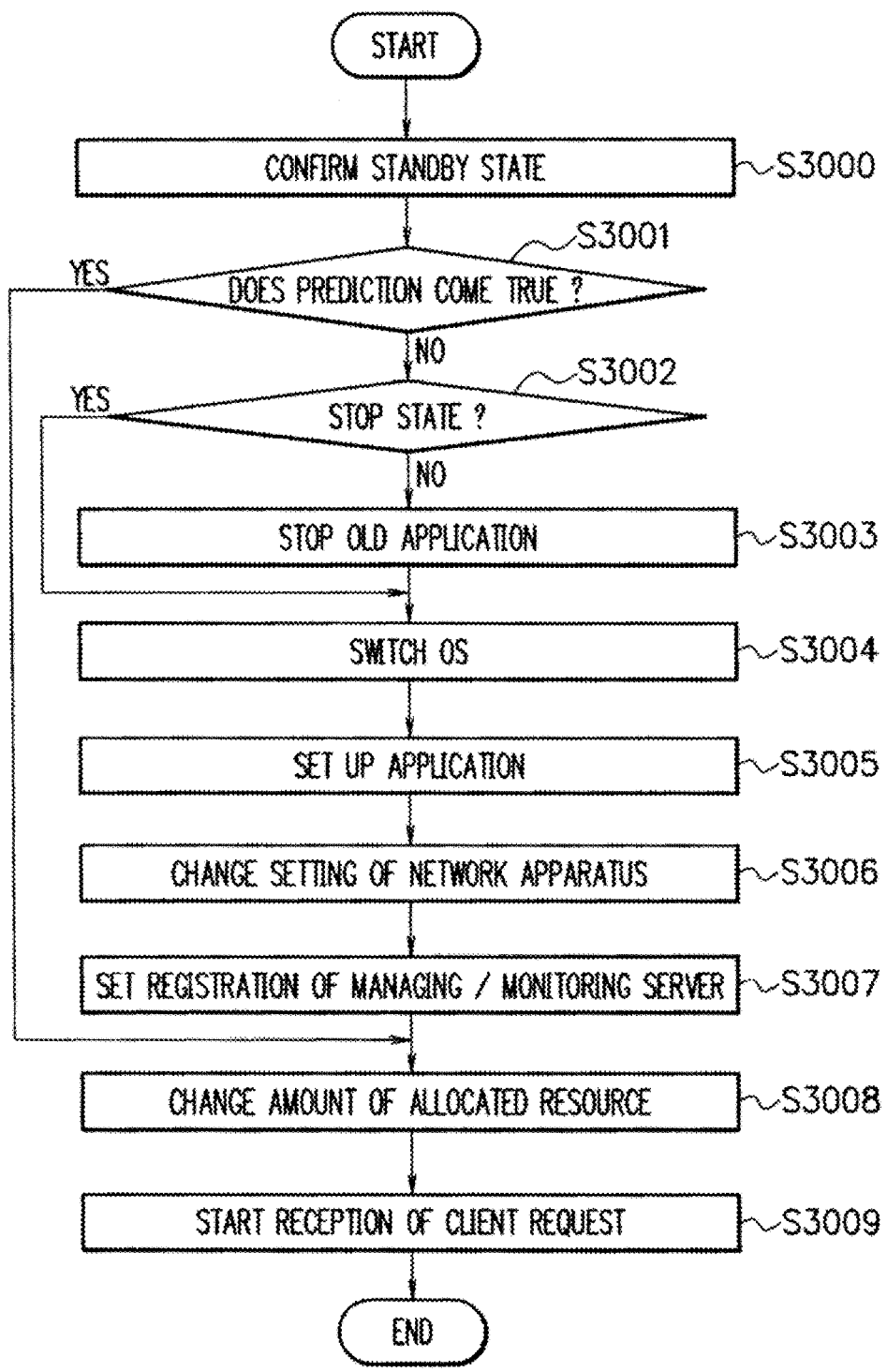
FIG. 4 is a flowchart illustrating an operation sequence of when provisioning is executed.
Figure 8:
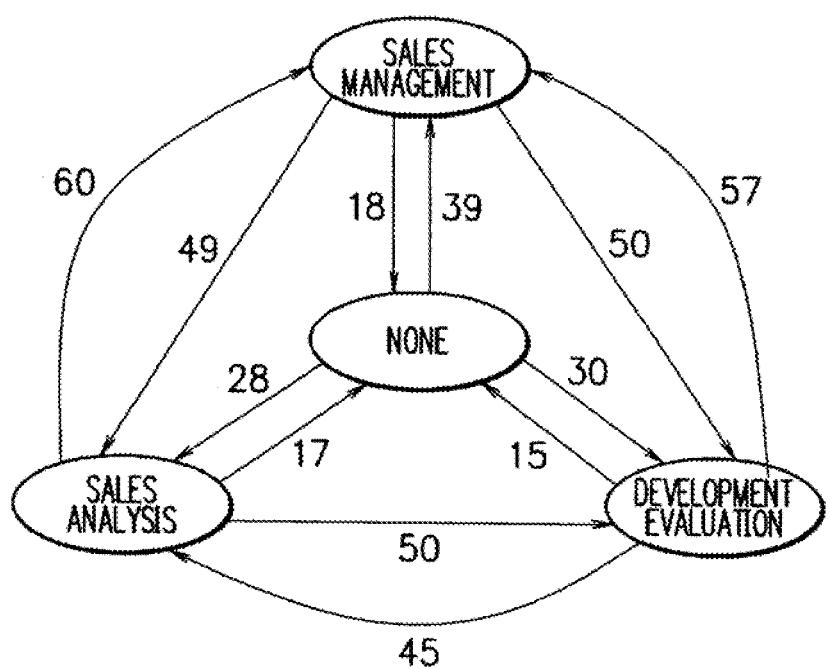
FIG. 8 is a diagram illustrating a specific example of a state change cost graph.
Figures 15, 16:
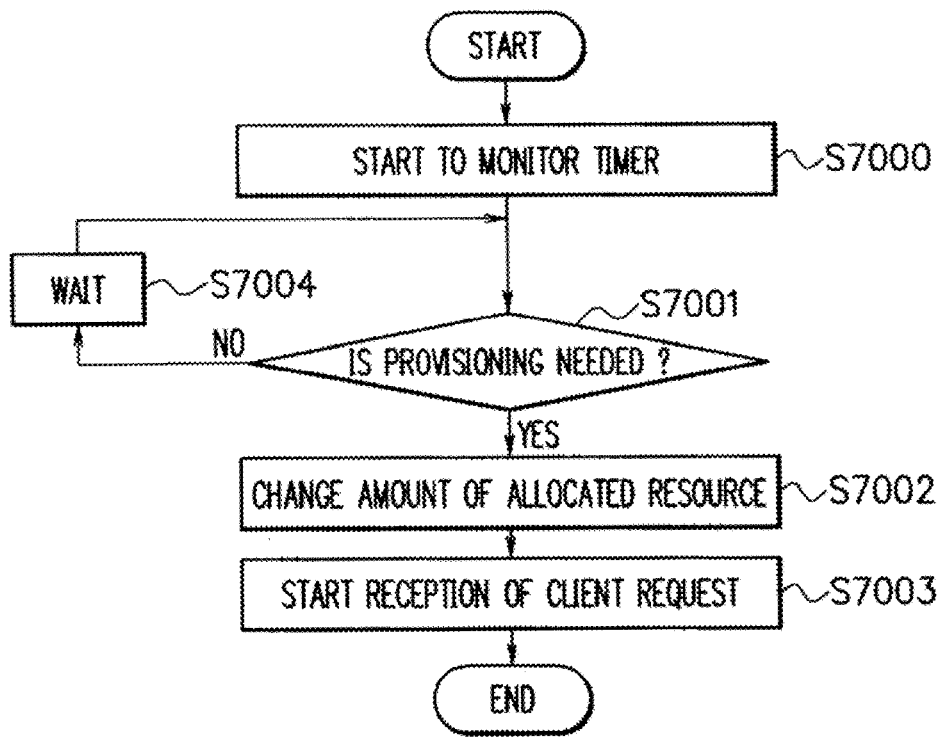
FIG. 15 is a diagram illustrating an example of a schedule.
FIG. 16 is a flowchart illustrating an operation sequence of when provisioning is executed in accordance with a third exemplary embodiment.

10: provisioning system
11: load balancer
20: managing server
21: information monitoring unit
22: standby construction determining unit
23: provisioning determining unit
24: control executing unit
25: schedule input unit
26: schedule managing unit
27: time monitoring unit
31 to 36: server
40: shared server
41: active virtual machine
42: standby virtual machine
43: virtual machine monitor
50: shared disk device

The invention claimed is:

1. A provisioning system comprising:
a plurality of servers comprising processors which operate a first application system and a second application system, at least one of the plurality of servers being configured as a shared server that configures a plurality of virtual machines;
a standby constructing unit that starts a standby virtual machine on the shared server with a resource amount smaller than the resource amount allocated to an active virtual machine, which is provisioned for operating the first application system on the shared server, and prepares provisioning to operate a target application system comprising one of the first application system and the second application system on the standby virtual machine when a provisioning request for the target application system is predicted; and
a provisioning executing unit that changes the resource allocation amounts of the active virtual machine and the standby virtual machine and performs the provisioning,
wherein the standby constructing unit calculates a probability of the provisioning request being generated after a predetermined time from a current point of time, based on a load state of a corresponding server which operates the target application system, and predicts that the provisioning request is generated when the calculated probability is equal to or greater than a threshold value.

2. The provisioning system according to claim 1, wherein the standby constructing unit predicts a generation of the provisioning request further based on statistical information of a past load state of the corresponding server.

3. The provisioning system according to claim 1, wherein the standby constructing unit calculates the probability of the provisioning request being generated for each of the first and second application systems, based on the load state of each of corresponding servers and statistical information of a past load state of each of the corresponding servers.

4. The provisioning system according to claim 3, wherein the standby constructing unit determines one of the first and second application systems becoming a target of the provisioning, based on the calculated probability and a state change cost graph indicating a time cost needed for switching between the first and second application systems.

5. The provisioning system according to claim 1, wherein the standby constructing unit executes at least a start of an OS and a start of an application on the standby virtual machine.

6. The provisioning system according to claim 5, wherein the standby constructing unit uses a disk image stored in a shared disk to start the OS and the application on the standby virtual machine.

7. The provisioning system according to claim 1, wherein the standby constructing unit executes at least one of an OS start, an application start, a setting change, a patch application, a network configuration change, registration setting to a managing server, and registration setting to the shared server, on the standby virtual machine.

8. The provisioning system according to claim 1, wherein the provisioning executing unit sets the resource amount allocated to the standby virtual machine to be larger than the resource amount allocated to the active virtual machine, and performs switching between the standby virtual machine and the active virtual machine.

9. The provisioning system according to claim 8, wherein, when the first application system or the second application system, which is a subject to the provisioning request, is matched with the target application system, the provisioning executing unit performs the switching between the standby virtual machine and the active virtual machine, and starts an operation of the target application system, by using the standby virtual machine.

10. The provisioning system according to claim 8, wherein, when the first application system or the second application system, which is a subject to the provisioning request, is mismatched with the target application system, the provisioning executing unit executes at least an OS start and an application start on the standby virtual machine, performs the switching between the standby virtual machine and the active virtual machine after the OS start and the application start, and starts an operation of the first application system or the second application system, which is the subject to the provisioning request, by using the standby virtual machine.

11. The provisioning system according to claim 8, wherein the provisioning executing unit registers the standby virtual machine in a load balancer that performs a load balancing of the first application system and the second application system, and starts an operation of the target application system, by using the standby virtual machine.

12. A provisioning method that uses a computer and in a system comprising a plurality of servers which operates a first application system and a second application system, at least one of the plurality of servers being configured as a shared server that configures a plurality of virtual machines, the computer executing the provisioning method comprising:

starting a standby virtual machine on the shared server with a resource amount smaller than the resource amount allocated to an active virtual machine, which is provisioned for operating the first application system on the shared server;

preparing provisioning to operate a target application system comprising one of the first application system and the second application system on the standby virtual machine when a provisioning request for the target application system is predicted; and changing the resource allocation amounts of the active virtual machine and the standby virtual machine and performing the provisioning, wherein the computer calculates a probability of the provisioning request being generated after a predetermined time from a current point of time, based on a load state of a corresponding server which operates the target application system, and predicts that the provisioning request is generated when the calculated probability is equal to or greater than a threshold value.

13. The provisioning method according to claim 12, wherein the computer predicts a generation of the provisioning request further based on statistical information of a past load state of the corresponding server.

14. The provisioning method according to claim 12, wherein the computer calculates the probability of the provisioning request being generated for each of the first application system and the second application system, based on the load state of each of corresponding servers and statistical information of a past load state of each of the corresponding servers.

15. The provisioning method according to claim 14, wherein the computer determines the first application system or the second application system becoming a target of the provisioning, based on the calculated probability and a state change cost graph indicating a time cost needed for switching between the first and second application systems.

16. The provisioning method according to claim 12, wherein computer executes at least a start of an OS and a start of an application on the standby virtual machine.

17. The provisioning method according to claim 16, wherein the computer uses a disk image stored in a shared disk to start the OS and the application on the standby virtual machine.

18. The provisioning method according to claim 12, wherein the computer executes at least one of an OS start, an application start, a setting change, a patch application, a network configuration change, a registration setting to a managing server, and a registration setting to the shared server, on the standby virtual machine.

19. The provisioning method according to claim 12, wherein the computer sets the resource amount allocated to the standby virtual machine to be larger than the resource amount allocated to the active virtual machine, and performs switching between the standby virtual machine and the active virtual machine.

20. The provisioning method according to claim 19, wherein, when the first application system or the second application system, which is a subject to the provisioning request, is matched with the target application system, the computer performs the switching between the standby virtual machine and the active virtual machine, and starts an operation of the target application system, by using the standby virtual machine.

21. The provisioning method according to claim 19, wherein, when the first application system or the second application system, which is a subject to the provisioning request, is mismatched with the target application system, the computer executes at least an OS start and an application start on the standby virtual machine, performs the switching between the standby virtual machine and the active virtual machine after the OS start and the application start, and starts an operation of the first application system or the second application system, which is the subject to the provisioning request, by using the standby virtual machine.

22. The provisioning method according to claim 19, wherein the computer registers the standby virtual machine in a load balancer that performs a load balancing of the first application system and the second application system, and
   starts an operation of the target application system, by using the standby virtual machine.

23. A non-transitory computer-readable medium storing a program that, when executed by a computer, causes the computer to execute a provisioning process in a system comprising a plurality of servers that operates a first application system and second application system, at least one of the plurality of servers being configured as a shared server configuring a plurality of virtual machines, the provisioning process executed by the computer comprising:
   a standby constructing process of starting a standby virtual machine on the shared server with a resource amount smaller than the resource amount of an active virtual machine, which is provisioned for operating the first application system on the shared server, and preparing provisioning to operate a target application system comprising one of the first application system and the second application system on the standby virtual machine when a provisioning request for the target application system is predicted; and
   a provisioning executing process of changing the resource allocation amounts of the active virtual machine and the standby virtual machine and performing the provisioning,
   wherein, in the standby constructing process, the computer calculates a probability of the provisioning request being generated after a predetermined time from a current point of time, based on a load state of a corresponding server which operates the target application system, and predicts that the provisioning request is generated when the calculated probability is equal to or greater than a threshold value.

24. The non-transitory computer-readable medium according to claim 23, wherein, in the standby constructing process, the computer predicts a generation of the provisioning request further based on statistical information of a past load state of the corresponding server.

25. The non-transitory computer-readable medium according to claim 23, wherein, in the standby constructing process, the computer calculates the probability of the provisioning request being generated for each of the first application system and the second application system, based on the load state of each of corresponding servers and statistical information of a past load state of each of the corresponding servers.

26. The non-transitory computer-readable medium according to claim 25, wherein, in the standby constructing process, the computer determines the first application system or the second application system becoming a target of the provisioning, based on the calculated probability and a state change cost graph indicating a time cost needed for switching between the first and second application systems.

27. The non-transitory computer-readable medium according to claim 23, wherein, in the standby constructing process, the computer executes at least a start of an OS and a start of an application on the standby virtual machine.

28. The non-transitory computer-readable medium according to claim 27, wherein, in the standby constructing process, the computer uses a disk image stored in a shared disk to start the OS and the application on the standby virtual machine.

29. The non-transitory computer-readable medium according to claim 23, wherein, in the standby constructing process, the computer executes at least one of an OS start, an application start, a setting change, a patch application, a network configuration change, a registration setting to a managing server, and a registration setting to the shared server, on the standby virtual machine.

30. The non-transitory computer-readable medium according to claim 23, wherein, in the provisioning executing process, the computer sets the resource amount allocated to the standby virtual machine to be larger than the resource amount allocated to the active virtual machine, and performs switching between the standby virtual machine and the active virtual machine.

31. The non-transitory computer-readable medium according to claim 30, wherein, in the provisioning executing process, when the first application system or the second application system, which is a subject to the provisioning request, is matched with the target application system, the computer performs the switching between the standby virtual machine and the active virtual machine, and starts an operation of the target application system, by using the standby virtual machine.

32. The non-transitory computer-readable medium according to claim 30, wherein, in the provisioning executing process, when the first application system or the second application system, which is a subject to the provisioning request, is mismatched with the target application system, the computer executes at least an OS start and an application start on the standby virtual machine, performs the switching between the standby virtual machine and the active virtual machine after the OS start and the application start, and starts an operation of the first application system or the second application system, which is the subject to the provisioning request, by using the standby virtual machine.

33. The non-transitory computer-readable medium according to claim 30, wherein, in the provisioning executing process, the computer registers the standby virtual machine in a load balancer that performs a load balancing of the first application system and the second application system, and starts an operation of the target application system, by using the standby virtual machine.

* * * * *